United States Patent [19]

Watterson et al.

[11] Patent Number: 4,969,180
[45] Date of Patent: Nov. 6, 1990

[54] CORDLESS PEN TELEPHONE HANDSET

[75] Inventors: Michael R. Watterson, Carrickfergus, GB5; Raoul Schneiderman, Jerusalem, Israel

[73] Assignee: I.I.N.V. Computing Ltd., Jerusalem, Israel

[21] Appl. No.: 353,707

[22] Filed: May 18, 1989

[51] Int. Cl.$^5$ .............................................. H04M 11/00
[52] U.S. Cl. ......................................... 379/58; 379/61; 379/434
[58] Field of Search ................. 379/234, 110, 56, 58; 455/90, 89; D14/143, 148

[56] References Cited

U.S. PATENT DOCUMENTS

| | | | |
|---|---|---|---|
| 4,126,768 | 11/1978 | Grenzow | 379/357 |
| 4,542,262 | 9/1985 | Ruff | 379/56 |
| 4,763,355 | 8/1988 | Cox | 379/355 |

FOREIGN PATENT DOCUMENTS

| | | |
|---|---|---|
| 0425040 | 9/1947 | Italy . |
| 2066743 | 7/1981 | United Kingdom . |

*Primary Examiner*—Jin F. Ng
*Assistant Examiner*—Magdy Shehata
*Attorney, Agent, or Firm*—Edward Langer

[57] ABSTRACT

A fully functional writing pen having incorporated therein electronic circuitry including a miniature microphone and earpiece speaker serving as a handset in a cordless telephone system. The cordless pen handset microphone and earpiece communicate via an ultrasonic link to an ultrasonic transceiver provided in a portable, pocket-sized keypad telephone dialer, which provides a cordless RF link to a base station connected by conventional means to a telephone network. The keypad dialer also may communicate on a cellular phone network using a transvertor as an adaptor, alternatively direct person-to-person communication with DPRS handsets or other similarly equipped users is possible without the telephone network. A set of depressable control buttons on the pen body enable fingertip control of the cordless telephone system, including an on-hook/off-hook switch control button and mute control button for private conversation screening during telephone calls. Upon receiving incoming calls, the pen earpiece is activated with a ringing signal so that the user can answer the call by depression of the on-hook/off-hook control button. A pen-mounted pressure sensor is provided in contact with the pen cartridge, for provision of various telephone system control functions, such as call access and volume control. An alarm clock within the portable keypad dialer signals the user via the earpiece, so that an audible reminder of important time-related activities is conveniently provided. For conference use the keypad dialer loudspeaker is switched on or off by alternate depression and release of the control buttons.

25 Claims, 20 Drawing Sheets

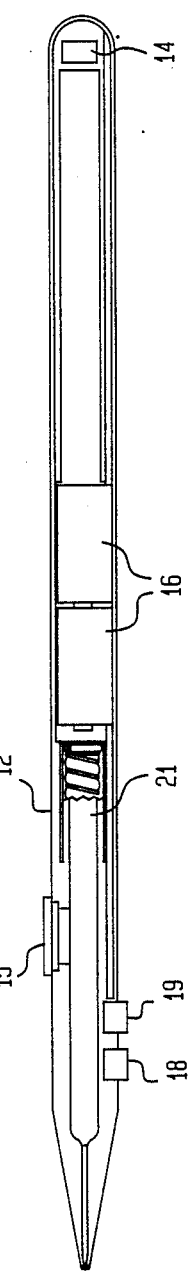
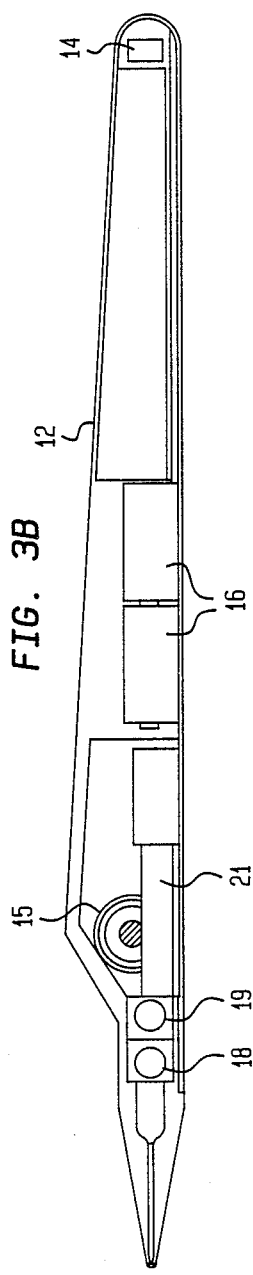
FIG. 3A
FIG. 3B

CORDLESS PEN TELEPHONE HANDSET

CROSS-REFERENCE TO RELATED APPLICATIONS

The present application is related to a previously filed application, assigned to the same assignee as the present application, entitled "PEN TELEPHONE HANDSET", filed May 9, 1989, the disclosure of which is incorporated herein by reference.

FIELD OF THE INVENTION

The present invention relates to telephone communications devices incorporating modular, cordless, and cellular telephone systems, and more particularly, to a novel design for a telephone handset which is provided in the form of a functional writing pen.

BACKGROUND OF THE INVENTION

The prior art contains many designs for cordless telephone systems, all representing variations on a common theme generated by the communications revolution. Cellular phone technology has given rise to one of the fastest-growing industries, and portable, personal communicators are already on the horizon. Examples of cordless telephone systems and accessories are included in the following list of U.S. Patents: U.S. Pat. No. 4,771,927 to Ventura; U.S. Pat. No. 4,768,219 to Tabe et al.; U.S. Pat. No. 4,752,949 to Hamilton et al.; U.S. Pat. No. 4,731,814 to Becker et al.; U.S. Pat. No. 4,706,274 to Atkinson et al.; U.S. Pat. No. 4,694,485 to Iwase.; U.S. Pat. No. 4,650,931 to Tsukada et al.; U.S. Pat. No. 4,640,987 to Tsukada et al.; U.S. Pat. No. 4,639,550 to Tsukada et al.; U.S. Pat. No. 4,639,549 to Hirayama et al.; U.S. Pat. No. 4,595,795 to Endo; and U.S. Pat. No. 4,467,140 to Fathauer et al.

In office and home environments, desk space and work areas are often overcrowded and there have been attempts to design conveniently arranged desktop units which incorporate a telephone and memo pad, pen holder etc. Examples of these are shown in U.S. Pat. Nos. 288,318 to Yuen, 287,127 to Yuen, and U.S. Pat. Nos. 4,077,521 to Alkins, 3,627,182 to Calkins, and 3,118,614 to Mosca.

The flexibility and tremendous mobility afforded by cordless telephone systems has been amply demonstrated. In the office equipment field, the need for convenience and functionality in design continues to drive the search for new and useful products to accomodate busy executives and employees.

With conventional cordless phones, access to the keypad for interaction with voice mail, voice menu and remote ordering systems is complicated by the fact that the oral instructions are directed to the user as the buttons are depressed. Therefore, the user attempts to hold the handset to the ear during button manipulation, making it difficult if not impossible to interact with the remote system. Similarly, use of visual display functions, such as numerical readout for calculators, call duration and time display are limited while the handset is held to the ear. With cordless and cellular systems using a separate handset, the handset cord may be a restriction in many applications and environments.

Most cordless telephone systems utilize an RF link with the base station. A question has arisen as to the safety of using RF transmitters in the handset which is held close to the eyes. Studies have shown this may contribute to formation of cataracts in the eye. No international limit on eye level field strength has been established.

Therefore, it would be desirable to provide safe cordless telephone communication systems which achieve a high degree of functionality and convenience based on physical location and layout aspects, while meeting high quality standards in technical performance, without use of RF in the cordless handset.

SUMMARY OF THE INVENTION

Accordingly, it is a principal object of the present invention to provide a cordless telephone communications system based on use of a functional writing pen as a cordless handset incorporating a microphone and speaker unit, which can conveniently serve as both a pen and a telephone handset for normal telephone conversation. Additionally the handset is usable for voice mail, dictation, and conferencing. A single handset and dialer combination is useable with cellular or cordless or other voice communication systems.

In accordance with a preferred embodiment of the present invention, there is provided a cordless pen telephone handset for a telephone system comprising:
a writing implement; and
telephone communication means comprising microphone and speaker means disposed within said writing implement for voice communication, said microphone and speaker means simultaneously maintaining an ultrasonic link for cordless communication with an ultrasonic transceiver means located external to said writing implement,
said telephone communication means being operable by fingertip control of depressable buttons mounted on said writing implement while it is hand-held in normal penmanship and handset positions.

In the preferred embodiment, the writing implement comprises a fully functional writing pen, which has incorporated within its interior electronic circuitry including a miniature microphone and earpiece speaker serving as a cordless handset in a cordless telephone system. The handset communicates using ultrasonic signals with a pocket-sized keypad telephone dialer, which provides a cordless link to a base station, an adaptor for a cellular network or directly to another personal communication handset, namely a keypad dialer described herein or a digital personal radio system handset (refered to as a DPRS handset). The base station is connected by conventional means to a telephone network.

Mounted on the pen body are a set of depressable control buttons which enable fingertip control of the cordless telephone system. These include an on-hook/off-hook switch control button and mute control button to block microphone pickup so that private conversation can be screened out during telephone calls. The portable keypad dialer has a pen holder for storage of the pen while not in use, and it can be placed on a desktop surface. A rechargeable set of batteries is provided in the keypad dialer, and via connection to a standard low voltage power-pak, these batteries are maintained under constant charge. Due to the extremely low power consumption, the handset may use disposable cells or a solar charged rechargeable battery set.

Once activated to initiate a telephone call by depression of the pen-mounted on-hook/off-hook switch control button, a dial tone is provided. The portable keypad dialer is then used to dial the call, and it can then be returned to the desktop or placed in a shirt pocket to allow for mobility, since it is linked via cordless connection to the base station.

The depressable pen-mounted buttons also provide automatic redial of the previously dialed number and a flash hook signal is generated by depressing both buttons simultaneously.

Upon receiving incoming calls, the pen earpiece is activated with a ringing signal so that the user can answer the call by depression of the on-hook/off-hook control button.

A feature of the pen handset is the use of a pen-mounted pressure sensor in contact with the pen cartridge. Various telephone system control functions can be provided based on the pressure applied to the pen cartridge when used as an ordinary pen for writing purposes. For example, if the pen handset user wishes to place a call, depression of the pen cartridge with a pre-determined amount of pressure can serve as a substitute for depression of the on-hook/off-hook control button. Thus, a telephone system dial tone can be immediately accessed, during normal pen use. Similarly, on receiving an audible ringing signal via the earpiece, incoming calls may be conveniently answered by depression of the pen cartridge.

In combination with the dial tone access and call answer features, the pen-mounted pressure sensor may be configured to allow for keypad dialer volume adjustment dependent on the amount and duration of pen cartridge depression.

Additionally, since the handset is cordless, in the shape of and functioning as a writing pen, the handset is a personal device. In addition to the normal personalisation possible with a pen (gold or platinum body or plating, engraved or printed logo or name etc.) each handset is unique. An electronic serial number is placed in the circuits during manufacture. This serial number or unique key is signalled continuously to the keypad dialer during operation. Thus, no unauthorized use of the phone system is possible without the correct cordless pen handset. As the serial number is unique and cannot be removed or altered without disabling the keypad dialer permanently, a stolen unit can be easily identified. This could be arranged to operate via phone systems such as the PABX or public exchange, which would read the serial number and be able to signal the approximate whereabouts of the misplaced or stolen system.

Other features of the invention are the provision of an alarm clock within the portable keypad dialer, which signals the user via the earpiece, so that an audible reminder of important time-related activities is conveniently provided. In addition, a loudspeaker is provided in the portable keypad dialer, for use in conference call applications. Switching between the pen handset and the portable keypad dialer speakerphone is accomplished by alternate depression and release of the mute control button to effect a clicking operation which senses this mode. The speakerphone option can be arranged to operate simultaneously with normal pen handset operation.

Yet another feature is the capability to use the same pen handset and keypad dialer combination in different communication environments using a combination of digital technology in the keypad dialer, digital cordless phone base stations, transvertor box to cellular networks, adaptor cables to personal computers, adaptor cables to dictation systems and direct communication between keypad dialers when distance permits. The direct communication facility bypasses telephone charges when users are nearby.

The selection of a particular configuration such as use of a cordless base station, cellular network via an adaptor or DPRS modes may be automatic or controlled by user preference. The automatic selection will always try to minimize call costs as DPRS mode incurs no telephone charges and cellular mode incurs very high telephone charges. For security transmission to a cordless base station, a similar keypad dialer or the cellular adaptor may use encrypted speech. On the public telephone network end-to-end encryption is only possible on ISDN circuits with similarly equipped subscribers, however the major security problem is the RF links which may be encrypted.

Other important novel features are that for a compact design, the microphone and earpiece are used as the ultrasonic cordless link transducers and that special power saving circuits described reduce the standby power to almost 1/10 of the normal power consumption.

Based on its unique design, the pen handset is cordless, lightweight, portable, unobtrusive, safe, secure, low powered and offers an extremely convenient approach to telephone communications. The easily accessable finger buttons on the pen body provide the full range of cordless telephone options while providing a fully functional writing pen. During group meetings and related desk work, the user is conveniently in touch with all the necessary parties by telephone even while writing, quickly and with minimal disturbance to others. In a conference call the unique cordless shape of the handset allows the speakerphone in the keypad dialer to be heard by all at a table, while the handset can be passed from person to person like a stick microphone.

To allow for easier use and personal preference, two versions of the inventive pen handset are provided. The first has the microphone at the writing end and the earpiece at the other end, and an alternate version has the microphone at the top and the earpiece at the writing tip, to accomodate various user preferences for button operation.

Other features and advantages of the invention will become apparent from the following drawings and description.

BRIEF DESCRIPTION OF THE DRAWINGS

For a better understanding of the invention with regard a preferred embodiment thereof, reference is made to the accompanying drawings in which like numerals designate corresponding elements or sections throughout, and in which:

FIGS. 3a–b are respectively, side and bottom cross-sectional views of an alternate arrangement of a microphone and earpiece used in the pen handset;

DETAILED DESCRIPTION OF A PREFERRED EMBODIMENT

Figure 1A:
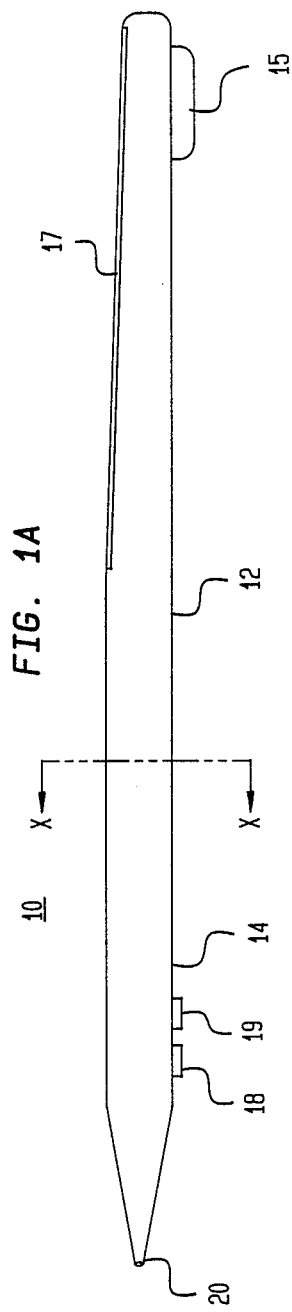
FIGS. 1a–c are, respectively, side views and a transverse cross-sectional view of a pen handset constructed in accordance with the principles of the present invention.
Figure 1B:
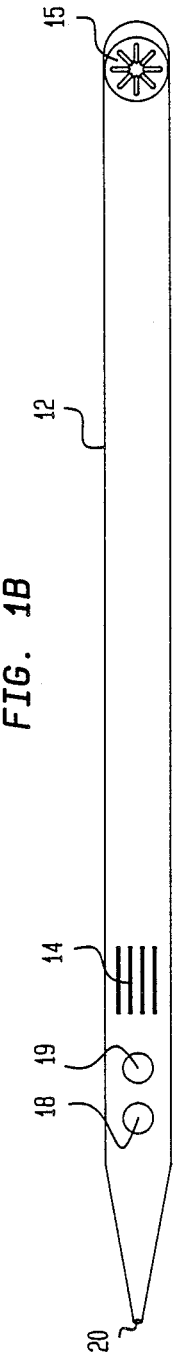
Figure 1C:
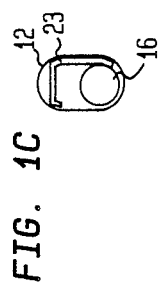

Referring now to FIGS. 1a-c, there are shown side views and a transverse cross-sectional view (lines X—X) of a preferred embodiment of a pen handset 10 constructed and operated in accordance with the principles of the present invention. Pen handset 10 comprises a functional writing pen enclosed within a pen body 12, in which there is mounted a microphone 14 and an earpiece 15. A battery cell 16 and optional solar cell 17 provide local power, and a set of control buttons 18 and 19 are mounted on pen body 12. A pen tip 20 serves the normal writing function, and as described further herein, is also capable of providing certain control features for telephone communications.

To achieve cordless operation, the inventive pen telephone handset 10 uses the normal telephone speech microphone 14 and earpiece 15 as receive and transmit transducers for ultrasonic signals which maintain the cordless link, instead of a normal telephone handset cord. Additionally, the inventive pen telephone handset 10 design uses acoustic chambers to provide directional speech sound waves and omnidirectional ultrasonic sound waves through separate apertures to avoid shielding of the signal by the user's ear or mouth. The ultrasonic link provides increased safety for pen handset 10 use near the eyes.

Figure 2A:
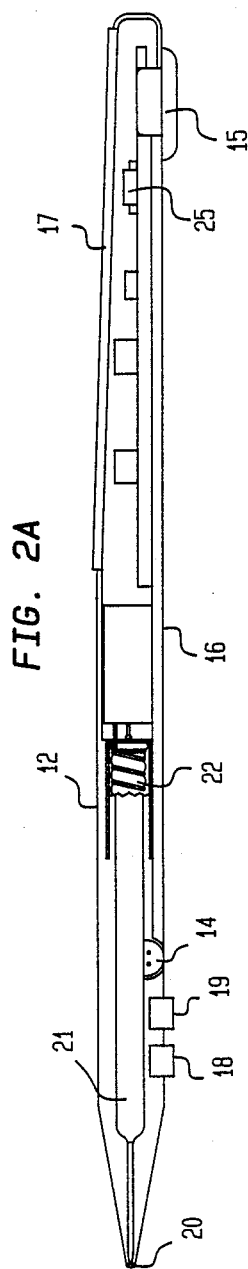
FIGS. 2a–d are respectively, longitudinal cross-sectional views of the pen handset shown in FIG. 1 and side and cross-sectional views of a pressure sensor for use therein.
Figure 2B:
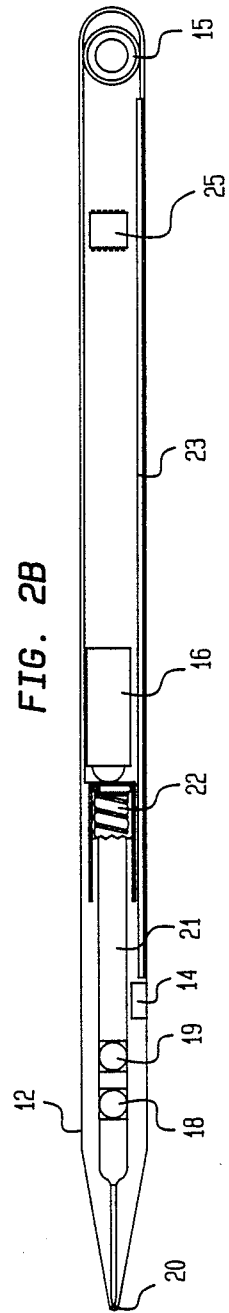

In FIGS. 2a-b, longitudinal cross-sectional views of pen handset 10 are shown, in which the layout of various electronic components within the interior of pen body 12 is revealed in relation to pen cartridge 21. Microphone 14 is mounted near the lower portion of pen body 12, while earpiece 15 is mounted near its upper end. Control buttons 18 and 19 are provided for respective call and mute functions of the cordless telephone system. A pressure sensor 22 is disposed in pen body 12 above pen cartridge 21 and is arranged to sense the level of writing pressure applied to pen tip 20. Circuit board 23 contains electronic components including an earpiece amplifier driver 25 configured in circuitry adapted for use in a cordless telephone system, as described further in the description of FIGS. 4-23.

Figure 2C:
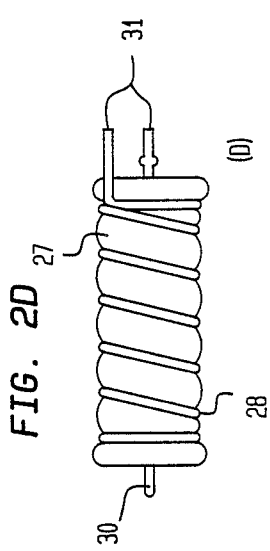
Figure 2D:
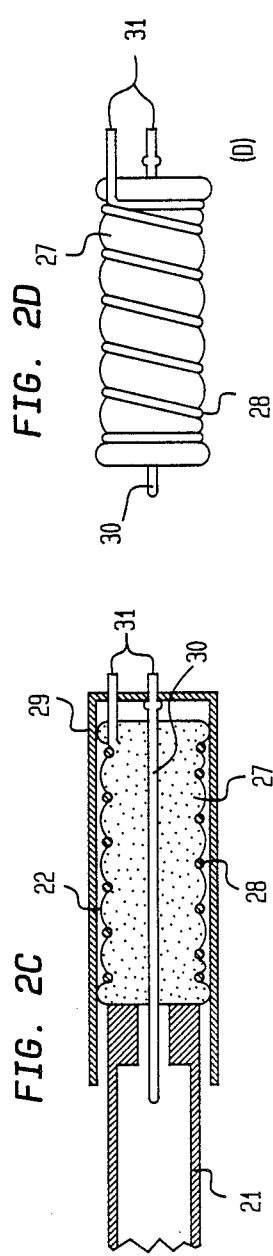

In FIGS. 2c-d, there are shown, respectively, side and cross-sectional views of an embodiment of a low-cost pressure sensor 22 for use in pen handset 10 of FIGS. 1-3. In this embodiment, pressure sensor 22 comprises a cylindrically-shaped length of anti-static or conductive foam 27 packaging material having coiled thereabout a spring 28 and being disposed between pen cartridge 21 and an interior partition 29 of pen body 12. A pin 30 extends within conductive foam 27, and leads 31 are provided for external connection. When pen tip 20 and cartridge 21 are depressed, the level of resistance existing between conductive foam 27 and pin 30 varies, providing an indication of the writing pressure. Other constructions of pressure sensor 22 are possible.

In FIGS. 3a-b, there are shown respectively, side and bottom cross-sectional views of an alternative embodiment of the handset with reversed placement of microphone 14 and earpiece 15 compared with FIGS. 1 and 2. This layout is based on the same principles and electronics, and better accomodates the needs of users who find the conventional hand clasp more comfortable when holding a telephone handset. This layout may in addition be advantageous when using the microphone while writing with the pen. Also, the pen handset may be adapted to allow placement of a writing tip cap on the microphone end while the pen handset is in use.

Figure 4:
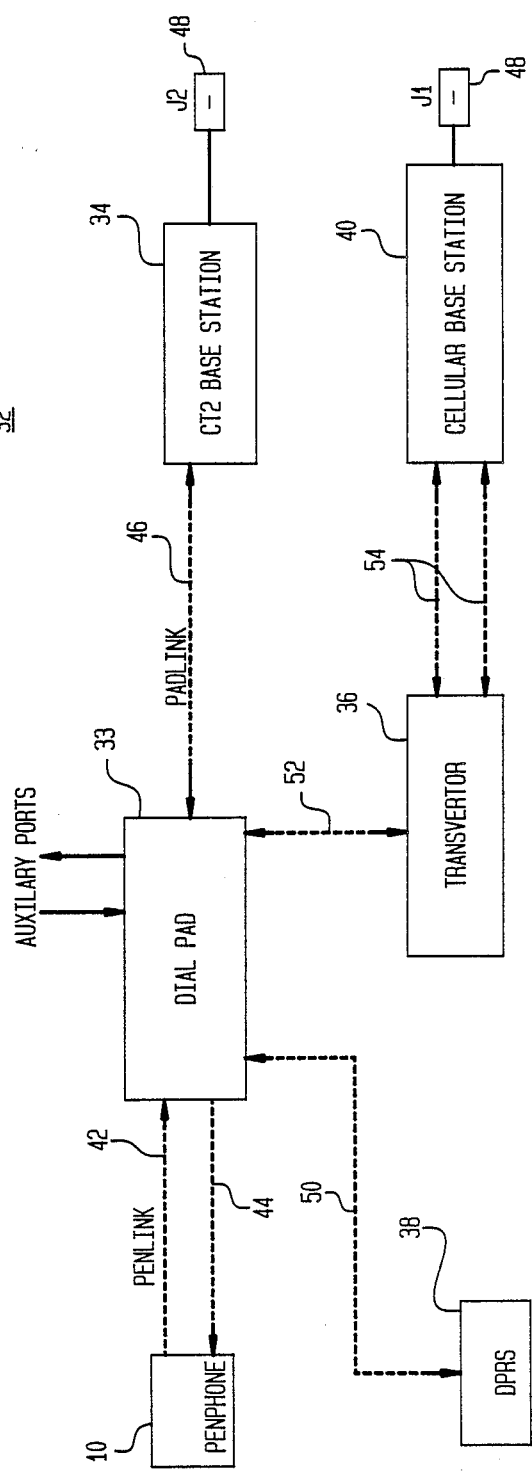
FIG. 4 is an overall electronic block diagram of a cordless telephone communication system comprising the inventive pen handset of FIGS. 1–3, a keypad dialer, a cordless phone base station, an adaptor or transvertor for cellular networks, a cellular base station, and DPRS (Digital Personal Radio System) handset.

Referring now to FIG. 4, there is shown an overall electronic block diagram of a cordless telephone communication system 32 comprising inventive pen handset 10, a keypad dialer 33, a cordless phone base station 34, a CT2/Cellular transvertor 36, a digital personal radio 38 and a cellular base station 40. As shown, signal and connection point labels appearing in one of the diagrams outside of a functional block apply throughout the page. Pin names of a functional block refer to the signal of the same name appearing on the circuit schematic for implementing the functional block. Signal names not appearing on the outline of a functional block or integrated circuit are global to the entire set of drawings. Components in different subsystems or repeated identical functional blocks may have the same designation (i.e. R207) but are differentiated by system name and/or figure number and/or functional block numerical designation.

Electronic blocks not detailed in schematic diagrams may be implemented using suitable state of the art techniques or using established cellular or cordless technology available from commercial manufacturers. The cordless phone base station 34 is not shown in detail as this may be an existing product available from commercial manufacturers, with the addition of a rechargeable backup supply. Similarly, the DPRS handset 38 in FIG. 4 is a standard item, albeit of very recent introduction.

Pen handset 10 is connected to keypad dialer 33 via cordless ultrasonic links 42 and 44, preferably 29 kHz and 56 kHz, respectively, and a cordless RF link 46 (typically 860 MHz) is provided between keypad dialer 33 and base station 34. Each of keypad dialer 33 and base station 34 is provided with a rechargeable battery power unit to receive charging power from a conventional low voltage power-pak (not shown). Base station 34 and cellular base station 40 are each connected to a telephone network using appropriate connection jacks 48 in conventional fashion.

Communication direct with a DPRS (Digital Personal Radio System) handset 38 is provided using an RF link 50 having a protocol used in such systems, typically 935 MHz. Two or more keypad dialers 33 may communicate directly in half-duplex mode without the telephone network using RF link 50. The transvertor 36 uses a link 52 to keypad dialer 33 which may be of the same type as link 46 between base station 34 and keypad dialer 33. Alternatively, link 52 may be the same type as the link 50 between the keypad dialer 33 and DPRS handset 38. Transvertor 36 uses the normal cellular protocols on link 54 between it and cellular base station 40, typically 720-980 MHz.

Cordless pen telephone handset 10 is designed to provide the functions of a telephone handset, including on-hook/off-hook control via call control button 18, and private conversation screening during telephone calls via mute control button 19. Keypad dialer 33 is used for fingertip dialing by depression of appropriate alphanumeric keys once a dial tone has been obtained using call control button 18 or by depression of pen cartridge 21.

The cordless RF link 46 maintained between keypad dialer 33 and base station 34 enables these to be separated by a reasonable distance of approximately 100 metres, based on regulations. The same distance applies with use of the transvertor 36 when operated in the CT2 mode. The distance for half-duplex DPRS using a DPRS RF Link between keypad dialers 33, transvertor 36 or a DPRS handset 38 is up to 8 km as defined by current regulations. The working distance for transvertor 36 depends on the type of cellular network, the cell size and the placement of transvertor 36 and cellular base station 40. The working distance for pen handset 10 to keypad dialer 33 is typically up to 1.5 meters. The major advantages of a handset over a loudspeaker phone at 1.5 meters are: (1) privacy of received speech, (2) large reduction of transmitted ambient speech and noise, and (3) true simultaneous two-way speech (almost impossible on a combined microphone and loudspeaker conference phone).

As described further herein, it is a particular feature of the present invention that, based on its novel electronic design, both audio and control signals (and data signals for later expansion) are carried by cordless ultrasonic links 42 and 44 between pen handset 10 and keypad dialer 33. The absence of a cord on handset 10 allows greater freedom of movement, even allowing writing while talking.

The ultrasonic link 42 carries audio, data and control signals. These include a signal strength report relating to ultrasonic link 44 (a 2 bit code LevelH and LevelL), control signals 55 and 56 (FIG. 5) provided by pen-mounted control buttons 18 and 19, pen writing pressure signal 57, a unique serial number and a 3-bit data signal group 58 (via connector J11) reserved for future pen functions labeled BA, BB and BC. The reverse path ultrasonic link 44 has speech only.

The ultrasonic links 42 and 44 use NBFM (narrow band FM) for the speech signal to reduce the effects of signal level variation caused by movement and varying path attenuation. A novel feature is the use of the signal level in pen handset 10 receiver to control the handset 10 transmitter power and the keypad dialer 33 transmitter power. This means that on ultrasonic links 42 and 44, as the handset-to-dialer distance decreases to one-half, almost one-quarter of the power is used on these links, conserving battery life significantly.

Another feature for power reduction is that while the pen handset 10 or keypad dialer 33 are not in use (i.e. standby mode) the receiver circuits are powered up intermittently to check for incoming calls. This increases standby mode battery life by over ten times.

Figure 5:
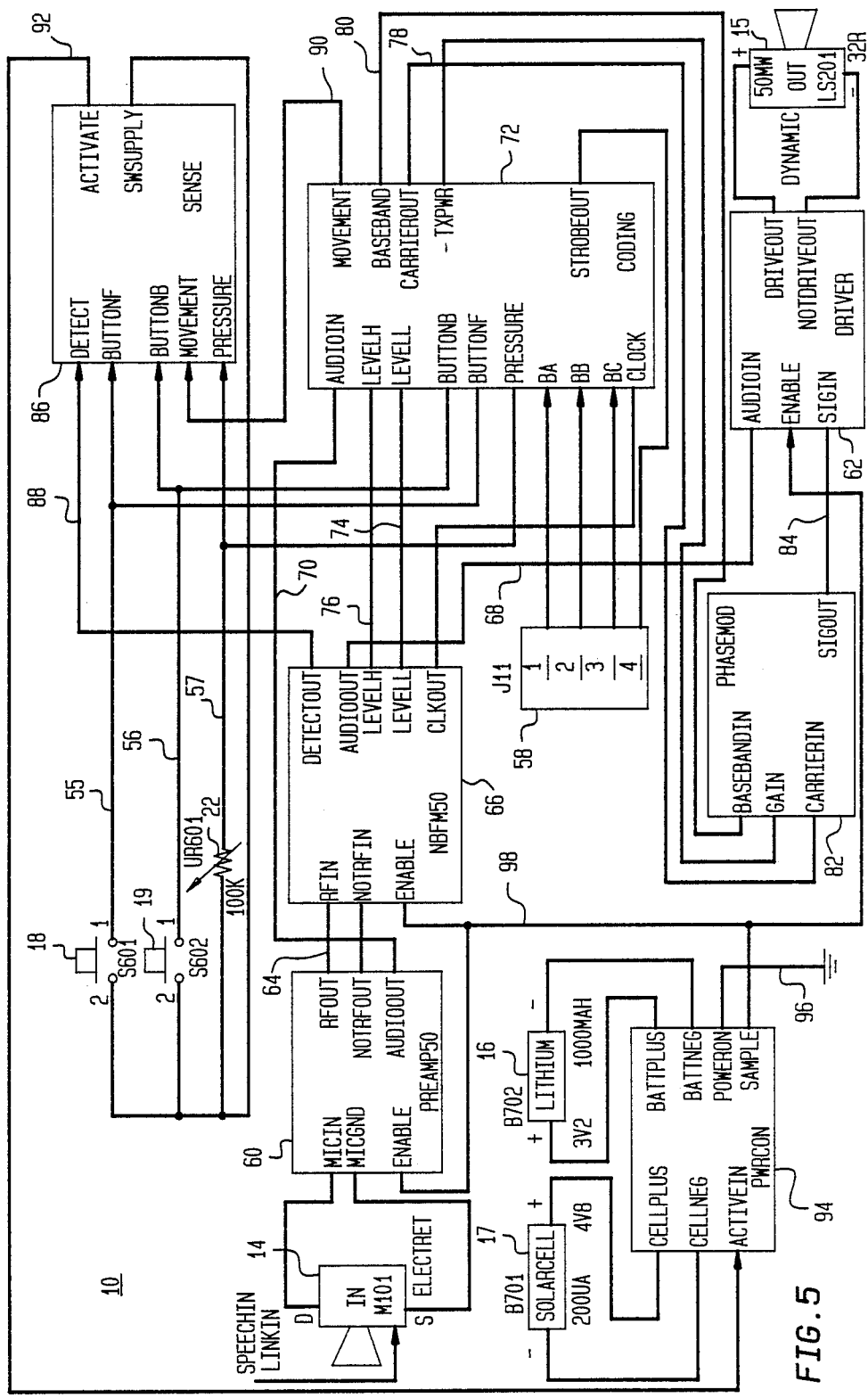
FIGS. 5-12 are, respectively, an electronic block diagram and circuit schematic diagrams of the pen handset portion of the communication system of FIG. 4.
Figure 6:
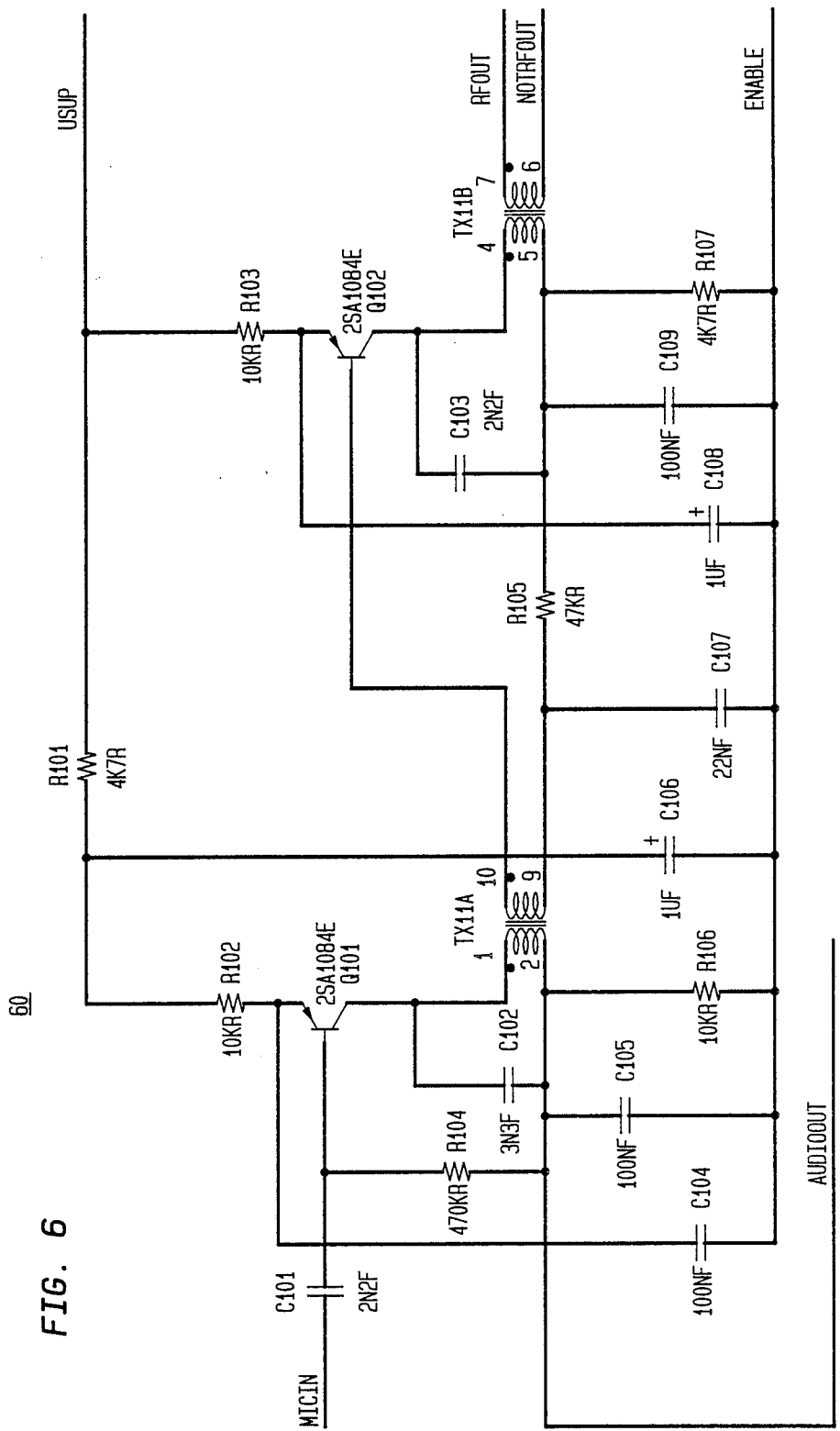
Figure 8:
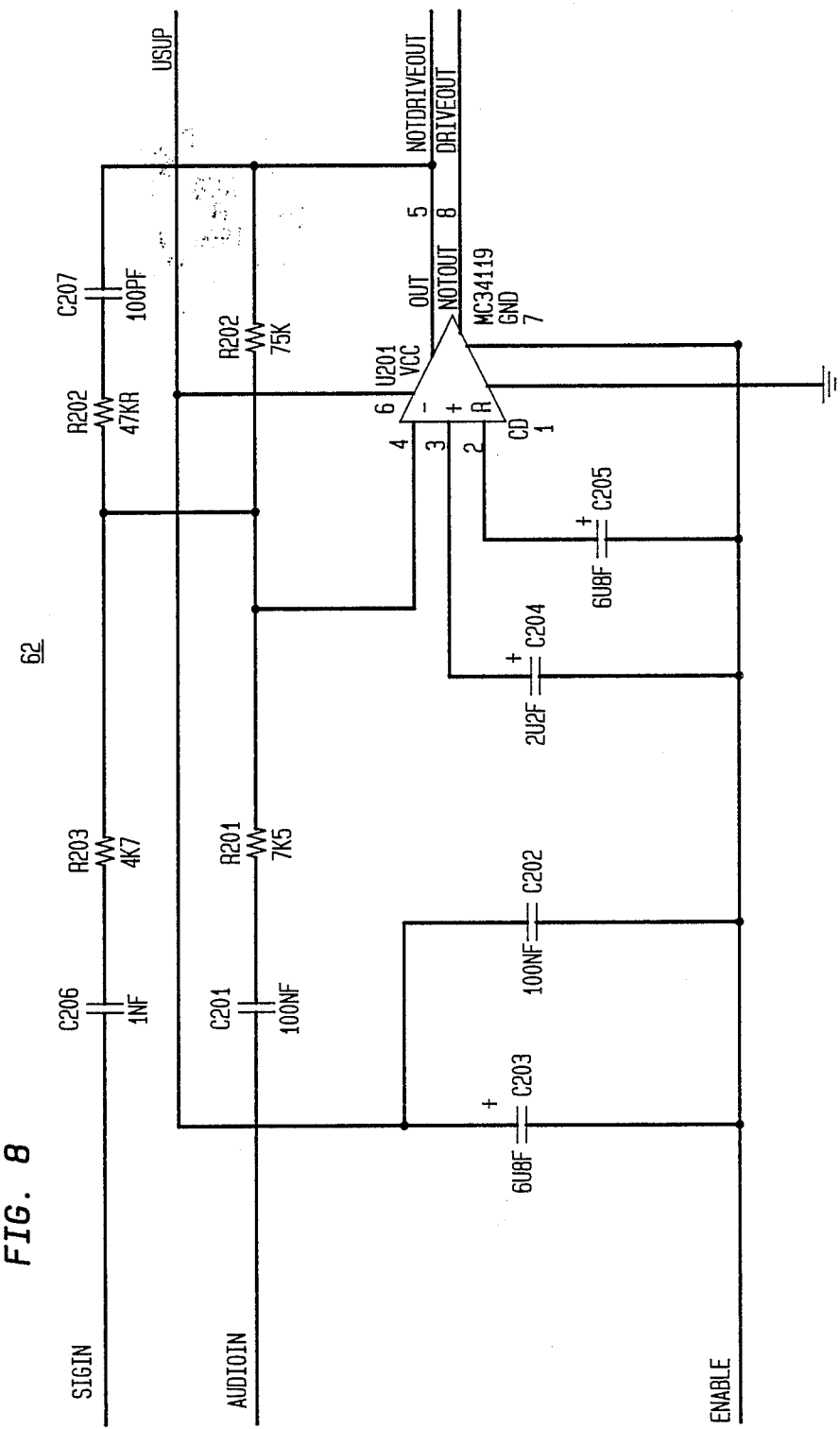

FIG. 5 shows an electronic block diagram of the cordless pen handset 10 portion of the cordless telephone communication system 32 of FIG. 4. A circuit schematic of preamplifier block 60 is shown in FIG. 6 and a circuit schematic of a driver block 62 is shown in FIG. 8. Blocks 60 and 62 operate with microphone 14 and earpiece 15, respectively provided as an electret-type and dynamic 32-ohm unit. Variable resistance-type pressure sensor 22 (VR601) in FIG. 5 is incorporated into the interior of pen body 12 and is arranged to sense the pressure applied to pen cartridge 21 via pen tip 20, which is provided as pressure signal 57.

As mentioned previously, it is a particular feature of the present invention that microphone 14 and earpiece 15 are used as speech and ultrasonic transducers. The speech and ultrasonic signals fed by microphone 14 are separated in a preamplifier block 60, with the ultrasonic signal leaving the RfOut pin as signal 64 and being demodulated in a narrow band FM receiver (NBFM50 block 66), shown as a circuit schematic in FIG. 7.

The demodulated speech from keypad dialer 33 is then passed from the AUDIO OUT pin of block 66 to the driver block 62 as signal 68, where the speech becomes audible on earpiece 15. Meanwhile, the speech picked up by microphone 14 is passed from the preamplifier 60 as signal 70 to a baseband coding block 72 shown in FIG. 9. Here, it is combined with the pressure signal 57, the unique serial number, the received signal strength code LevelL and LevelH signals 74 and 76, and the two control buttons 18 and 19 providing respective control signals 55 and 56. The carrier signal 78 and baseband signal 80 are passed to the phase modulation block 82, which is shown as a circuit schematic in FIG. 10.

The phase modulation block 82 produces a modulated signal 84 on the SIGOUT pin. This signal 84 is fed to earpiece 15 or in an alternative design implementation, to a separate transducer in series with earpiece 15, by the driver block 62.

The sensing block 86 (see circuit schematic of FIG. 11) is used to activate pen handset 10 if a carrier detect signal 88 occurs while in power-saving standby/sleep mode, or if a large change in writing pressure occurs, or if either or both buttons 18 and 19 are clicked or depressed. An additional sensing signal 90 is available for use with the 3-bit data signal 58 and is valid if this data changes. If no signals 55, 56, 57, 88 or 90 occur, pen handset 10 deactivates in a few seconds as the activate signal 92 from sensing block 86 becomes logic false. Signal 92 is passed from the sensing block 86 to the power controller block 94, which is detailed in FIG. 12.

When signal 92 is true, the power on signal 96 provides a system ground to power all the circuit blocks. When activate signal 92 is false, only sensing block 86 and power controller block 94 are powered continuously. Power controller block 94, which is detailed as a circuit schematic in FIG. 12, controls the standby power saving, and charging of battery cell 16 by solar cell 17.

When activate signal 92 is false, the power controller block 94 provides an enable signal 98 to power the preamplifier and the NBFM receiver blocks 60 and 66. This signal is periodic, the on-time being sufficent for a carrier detect signal 88 to be vaid, and the off-time being short enough to avoid too slow a response to a ringing phone signal. A compromise value may be 200 ms on-time and 1800 ms off-time. These are the respective awake and sleep states of the standby mode. Due to the long turn-on time of the circuit used to implement the driver block 62, the block receives the enable signal 98. The operation of driver 62 is described further herein in relation to FIG. 8.

Figure 9:
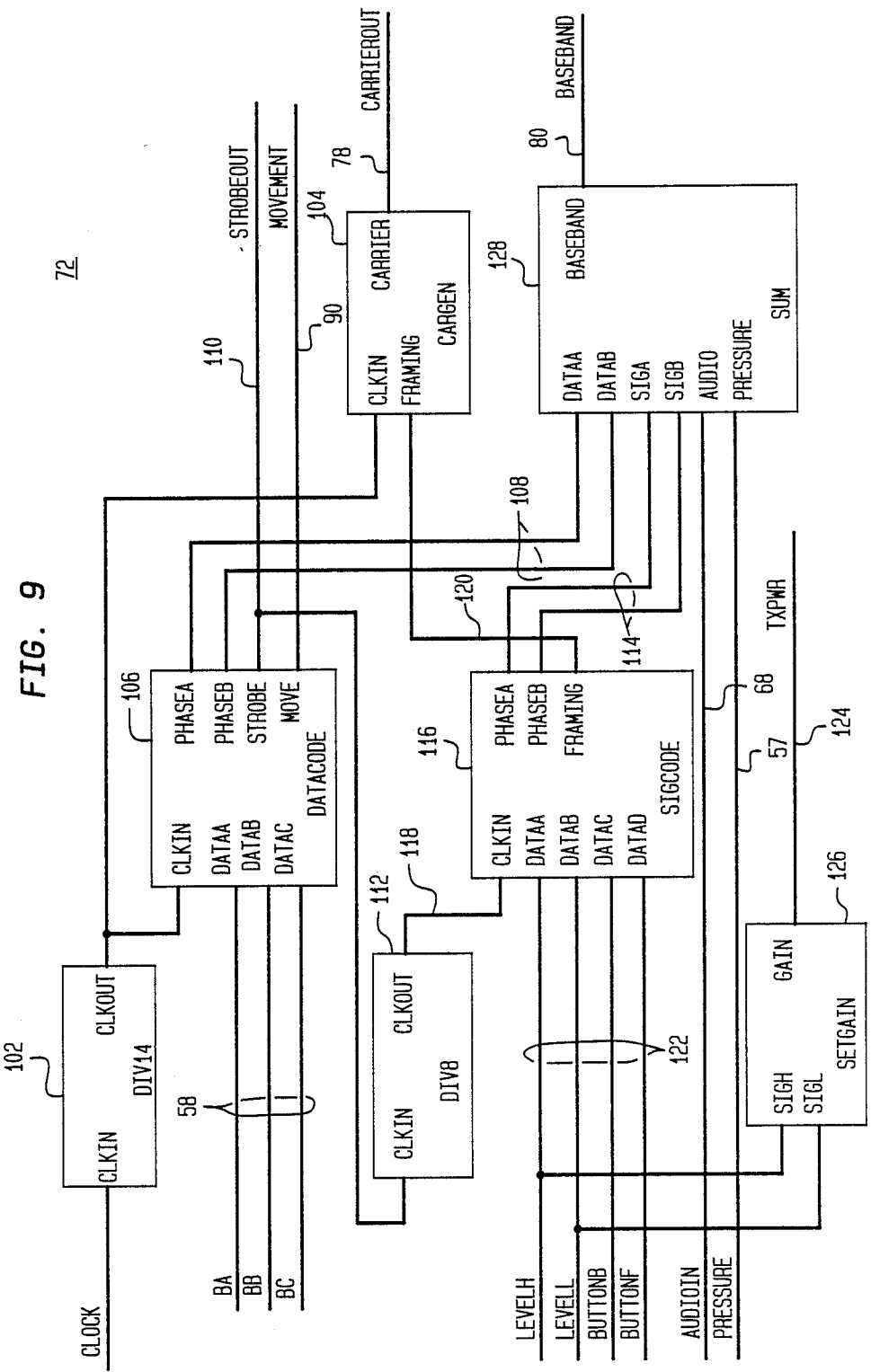

Referring now to FIGS. 6–12, there are shown electronic circuit schematics of pen handset 10 based on the electronic block diagram of FIG. 5. Typical component values and vendor part numbers are shown, allowing for implementation of these circuits based on the application of skill of the art electronic design techniques. FIG. 9 is shown as a more detailed block schematic.

As shown in FIG. 6, preamplifier 60 comprises a double-tuned 56 kHz low-noise, two transistor amplifier designed to have good audio rejection and low power consumption. The first stage Q101, also buffers the speech signal with a gain of −0.5dB.

Figure 7:
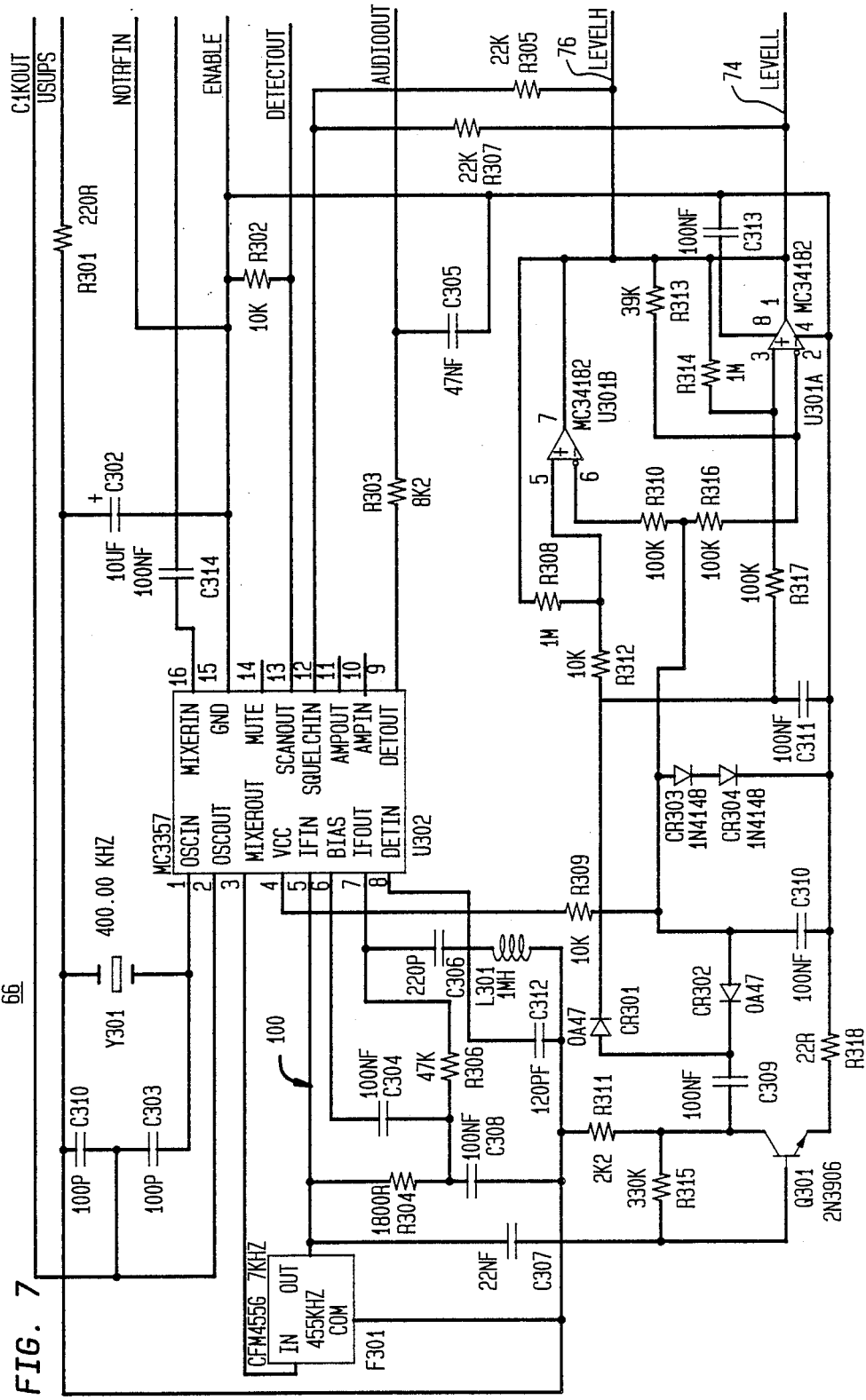
Figure 11:
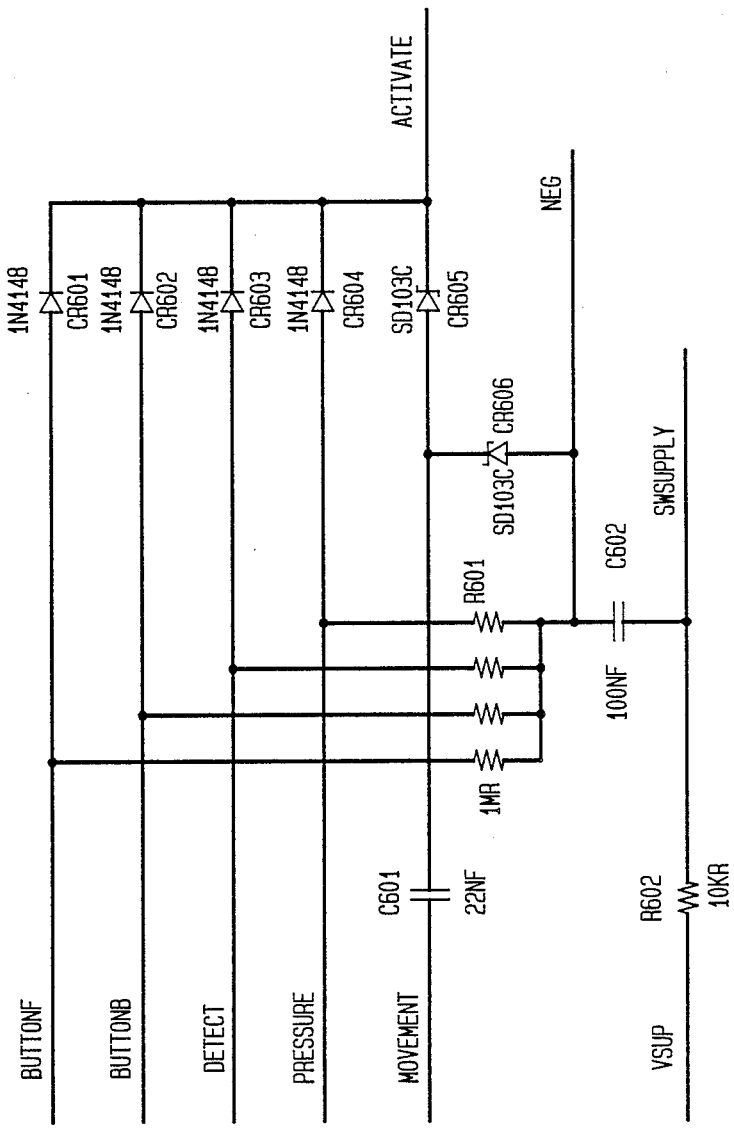

In FIG. 7, a standard low power FM mixer/IF IC (U302), such as a Motorola MC3357 type, is used as the basis of the receiver. The 400 kHz resonator Y301 used for the mixer local oscillator is also the pen handset 10 master clock source. The "unused" squelch amp on U302 may be used to implement the summing amplifier in FIG. 9, thus saving power and parts. The IF 455 kHz signal 100 is amplified and buffered by Q301 to drive two comparators implemented by U301a and U301b op-amps. These comparators (U301) are cross-connected to act as a 2-bit (4 state) analog to digital converter providing signals 74 and 76 (LevelL and LevelH) already described. The comparators (U301a,b) feed the noise detector on U302 which is used as a wired-OR gate to generate the carrier detect signal 88, which is fed to sensing block 86 (FIG. 11). The enable signal 98 provides power return (ground) intermittently while pen handset 10 is in standby mode, and provides ground continuously while pen handset 10 is active.

FIG. 8 is a circuit schematic of driver block 62 implemented as a low power bridge amplifier. A Motorola MC34119 is used but many similar components are usable. The quiescent current is 2.5 mA but the CD pin at logic true places the IC MC34119 in a power-saving standby mode. During sleep and awake states of the standby mode, the system ground is at Vsup (supply voltage level) so that U201 is disabled.

FIG. 9 diagramatically shows the functional block implementation of coding block 72 of FIG. 5. The circuit schematic of the functional blocks are not shown as these may be implemented by application of well-known techniques described in the literature. A divide-by-14 block 102 and a carrier generation block 104 divides the 400 kHz clock to provide a 28.57 kHz carrier signal 78 (other frequencies are possible, depending on the chosen ultrasonic transducers).

The data signal group 58 (signals BA, BB and BC) comprise a data channel which is directly coded by block 106 using 8 phase M-ary PSK, producing an approximately 7.2 kHz modulated carrier 108 at a sample rate of about ⅓ or 2400 Hz, as provided by strobe signal 110. These signals are the data channel reserved for future sensing functions related to movement of the pen handset, which may be detected in suitable fashion by motion detectors.

Other applications of the data channel are possible in non-pen, non-handset cordless transducer applications as may be required in medicine, remote data gathering or industrial control.

The last state of data signal group 58 is compared with the present state to generate a movement clock for sensing block 86. The strobe signal 110 is further divided by divide-by-8 block 112 to produce the carrier for a sub-audio signaling subcarrier 114 which is used to send the state of the two control buttons 18 and 19, the received signal strength code bits (signals 74 and 76) and the continuous transmission of the unique serial number in a ROM or PAL implementation of an 8 phase M-ary PSK coder block 116 using a carrier 118 of approximately 75 Hz. The use of eight phases or symbols allows transmission of 3 bits per signal sample at 37 Hz or 16 Hz approximately, depending on bandwidth and signaling speed requirements.

The most significant bit carries the four signals 55, 56, 74 and 76 in time-multiplexed fashion, in sequence. Thus, the sampling rate of the control buttons 18 and 19 is ¼ of the signaling rate. The remaining two bits of each signal sample carry the unique serial number as a sequential bit stream. This bit stream may be any length (such as 64 bits), which determines the recognition time of the serial number. Thus, the key rate or serial number rate is 1/32 of the signaling rate (typically 37/32 or just less than 1 second).

To enable synchronization of the decoder in the keypad dialer 33, the clocks are used to derive a short framing pulse 120 (typically 8 sample periods) when all 64 bits of the serial number have been sent. This pulse 120 inverts or reverses the phase of the main NBFM carrier signal 78, upon which there are modulated the subsonic carrier 114, the supersonic carrier 108, pressure signal 57 and audio signal 70. Since after demodulation at keypad dialer 33, the signal timing is distorted and is probably delayed, the subsonic carrier 114 carries a zero code symbol for the duration of and an equal period after the framing pulse 120. The start of a new subsonic data frame is indicated by a signal code symbol corresponding to seven or all ones for the eight-phase M-ary PSK subsonic carrier signal 114.

To avoid recovering a reference phase at the signal decoder 156 (FIG. 14) and the data decoder 154 in keypad dialer 33, the input codes on the two 8 phase M-ary PSK coders 106 and 116 do not correspond to phase symbols, rather a zero code causes no symbol change, and a one code causes a symbol increment every signal rate sample. Thus, a seven code on the input causes seven fold increment of the symbol phase every sample, that is, the relative phase between signal sample periods and not the absolute phase carries the code information on the data channel 58 and the signaling channel 122.

An additional power-saving feature is an output power level or gain control signal 124 used to control the signal output level of phase modulation block 82. This is derived by converting the decoded output of a two-bit counter which counts up if LevelL and LevelH signals 74 and 76 are false and which counts down if LevelL and LevelH are true. In any other state of signals 74 and 76, the counter remains unchanged. This counter and decoder are shown as gain setting block 126. The summer block 128 is fed by the various baseband signals 57, 68, 108 and 114 to produce a single baseband signal 80. As already mentioned, this can be implemented using a single op amp.

A prototype of the functions described in FIG. 9 may be implemented by application of skill of the art electronic design techniques using Eproms and/or registered PALs, in approximately eight integrated circuits. Once verified, the design can be transferred to gate array, more complex PLA or PAL or custom single chip for space and power conservation.

Figure 10:
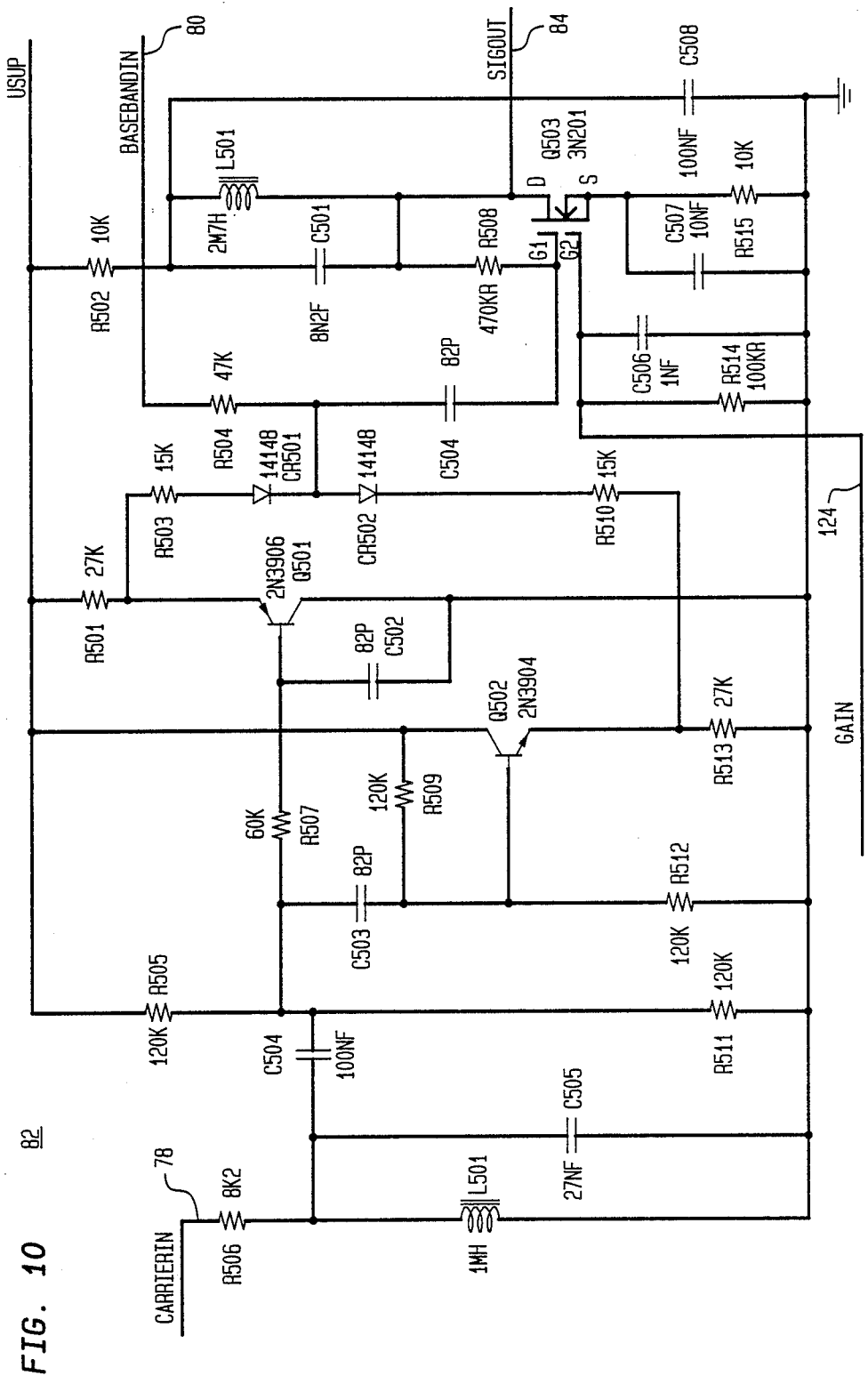

Referring now to FIG. 10, a preferred implementation of a low power NBFM modulator 82 (FIG. 5) is shown. This design features lower current consumption and use of a very low voltage supply (typically 1.5 to 4 V) and very low cost parts. The input carrier signal 78 is converted to a low level sine wave by R506, C505 and L501 forming a resonant circuit. A network of three resistors and two capacitors (R507, R509//R512, C503 and C502) form a phase splitter giving ±45 degree phase difference at the resonant frequency. A characteristic of this circuit is insensitivity to frequency as the relative phase is always 90 degrees. Transistors Q502 and Q501 buffer the signal and diodes CR501 and CR502 act as a voltage controlled potentiometer.

Mathematically, the circuit generates phase modulation by multiplying two carrier signals 90 degrees out of phase with one another by two baseband signals, one in phase and one inverted phase, respectively, and then summing the result. This is buffered and varied in amplitude by Q503, a dual gate MOSFET. The resultant SIGOUT signal 84 is fed to the driver block 62, previously described.

Figure 12:
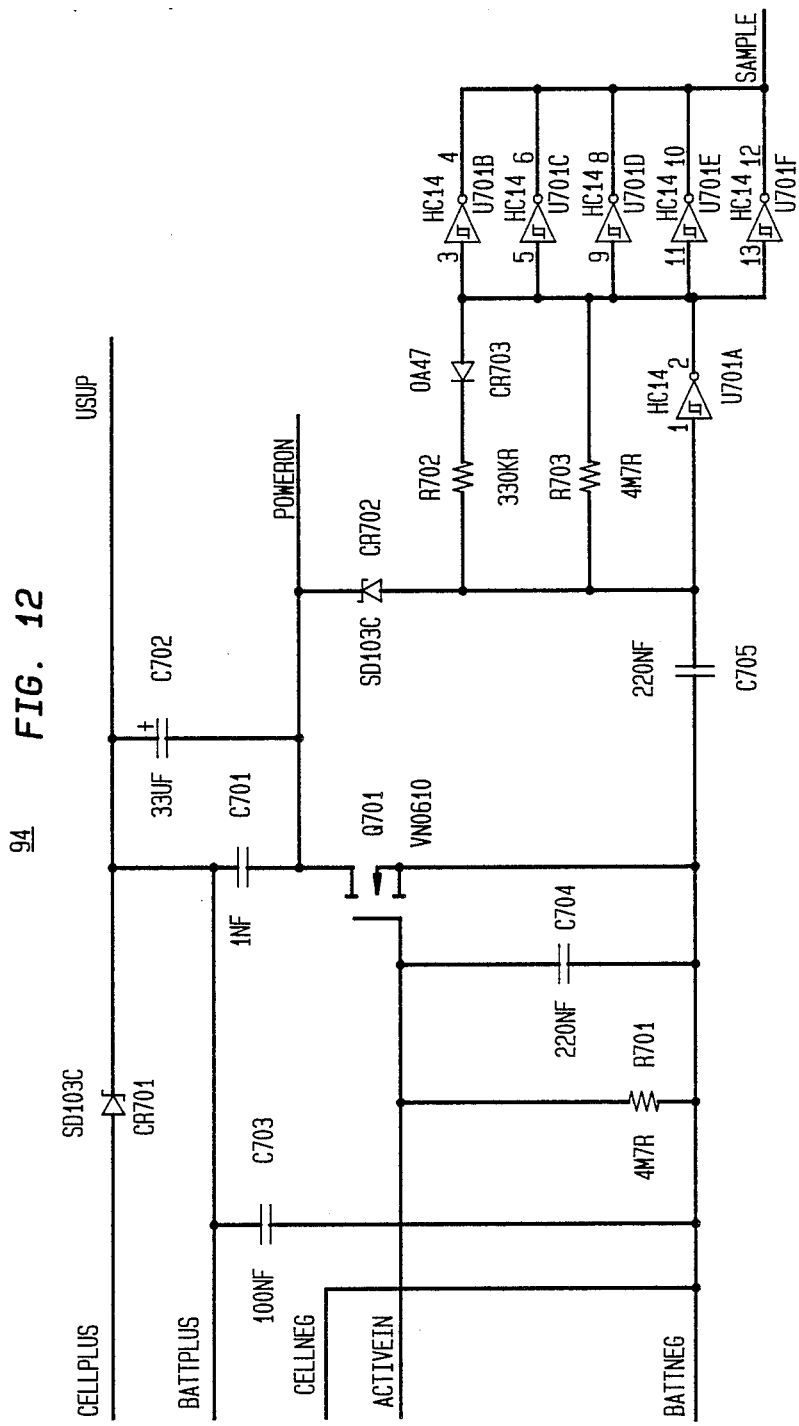

Referring now to FIGS. 11 and 12, implementation of the already described sensing block 86 and power controller block 94 functions are shown, and these circuits are straightforward and may be implemented in alternative ways by one skilled in the art.

Figure 13:
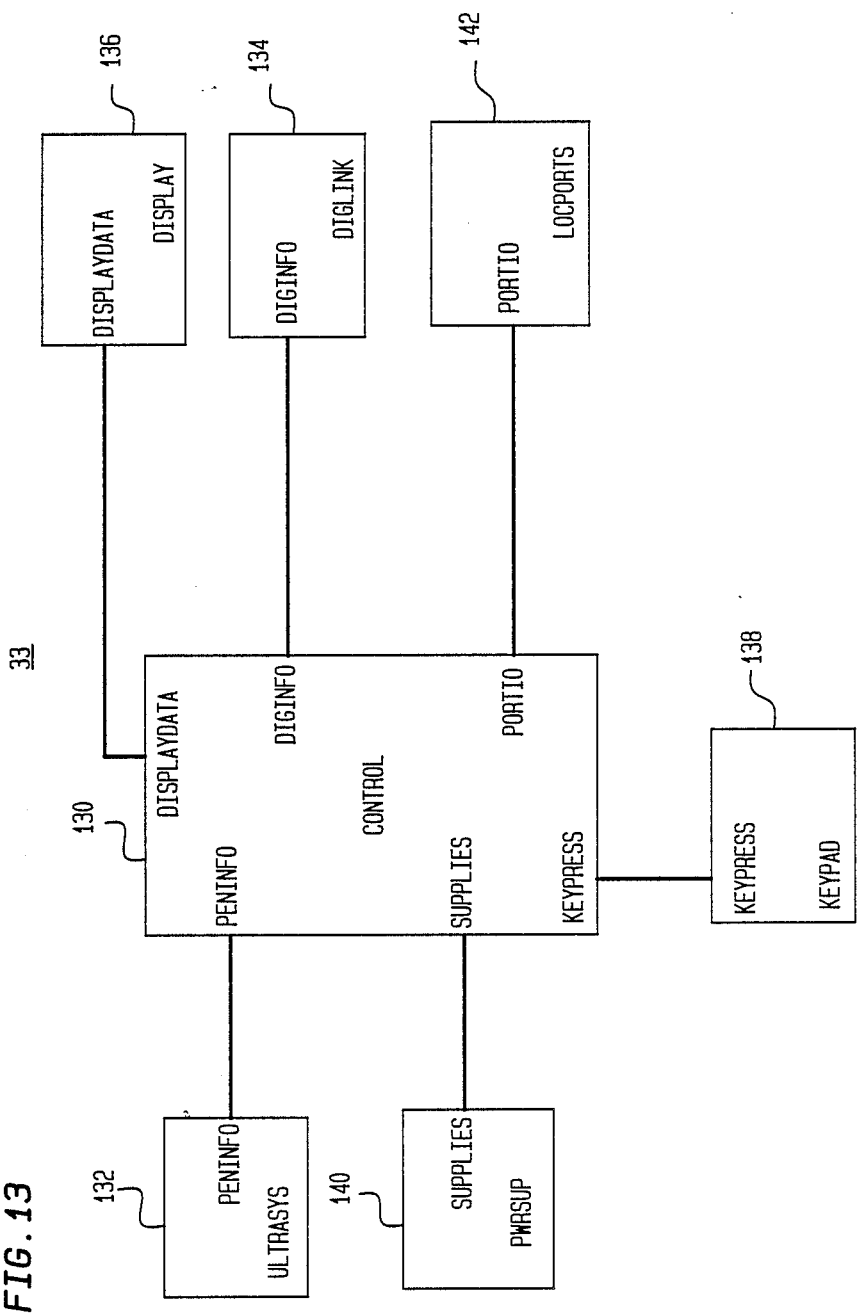
FIGS. 13-19 are, respectively, electronic block diagrams and circuit schematic diagrams of the keypad dialer shown in FIG. 4, including preamp, IF amplifier, narrow band FM receiver, 56 kHz modulator, and transducer driver blocks.

FIG. 13 shows an electronic block diagram of keypad dialer 33, comprising a control block 130, an ultrasonic subsystem 132, an RF interface 134, display 136, keypad 138, power supply system 140 and local ports 142.

Figure 14:
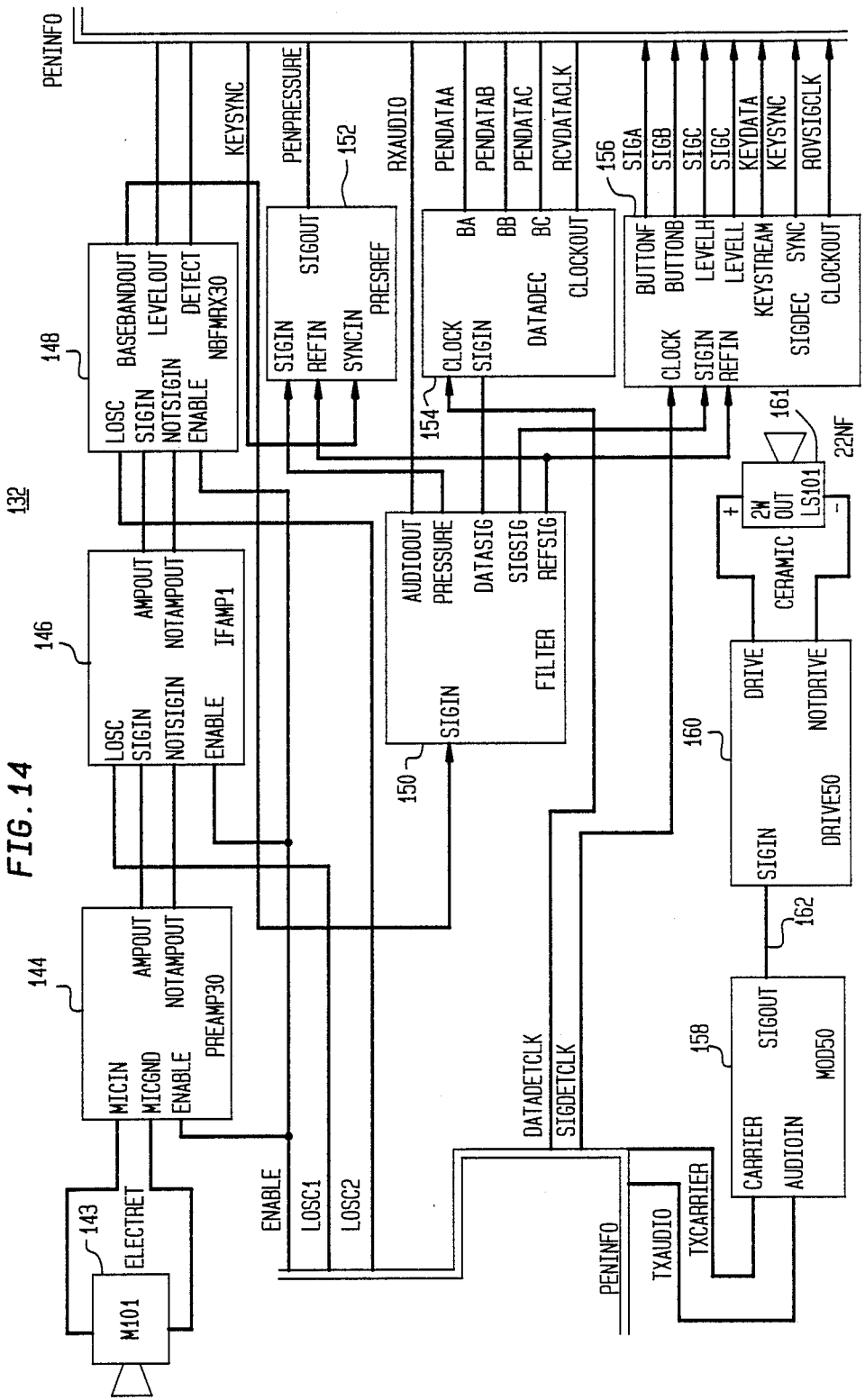

FIG. 14 shows the system block diagram of the ultrasonic subsystem 132, with each block being described in greater detail with reference to FIGS. 15-19. As shown, subsystem 132 comprises microphone 143 preamp 144 (FIG. 15), IF amp 146 (FIG. 16), NBFM receiver 148 (FIG. 17), filter block 150, pressure reference block 152, data channel decoder block 154, signaling channel decoder 156, phase modulator 158 (FIG. 18), ultrasonic driver block 160 (FIG. 19) and ceramic transducer 161.

The outgoing audio signal, derived from control block 130 is used to phase modulate a 56 kHz carrier also derived from control block 130. A peak deviation of ±PI radians is attainable. Pre-emphasis is added to the audio baseband in this block. The phase modulated carrier signal 162 is fed to the ultrasonic driver block 160, which drives the transducer 161, thus sending the ultrasonic modulated signal to microphone 14 of pen handset 10 which serves as a receiver.

Figure 15:
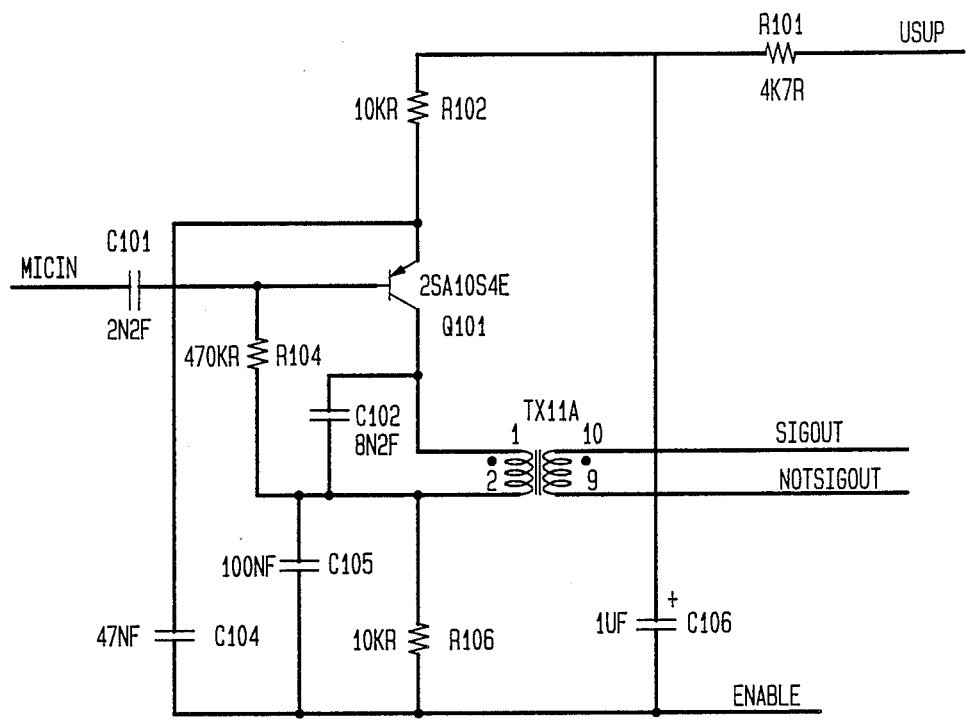
Figure 19:
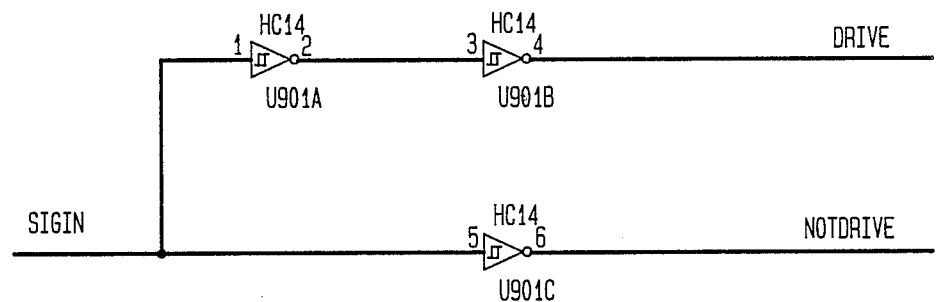

FIG. 15 shows the 28.57 kHz pre-amp 144. Its function is to amplify the weak signal at the terminals of the electret microphone 143 and to reject out of band signals (±7 kHz from the carrier), thus maximizing the S/N ratio for the next stage, the IF amp 146.

Figure 16:
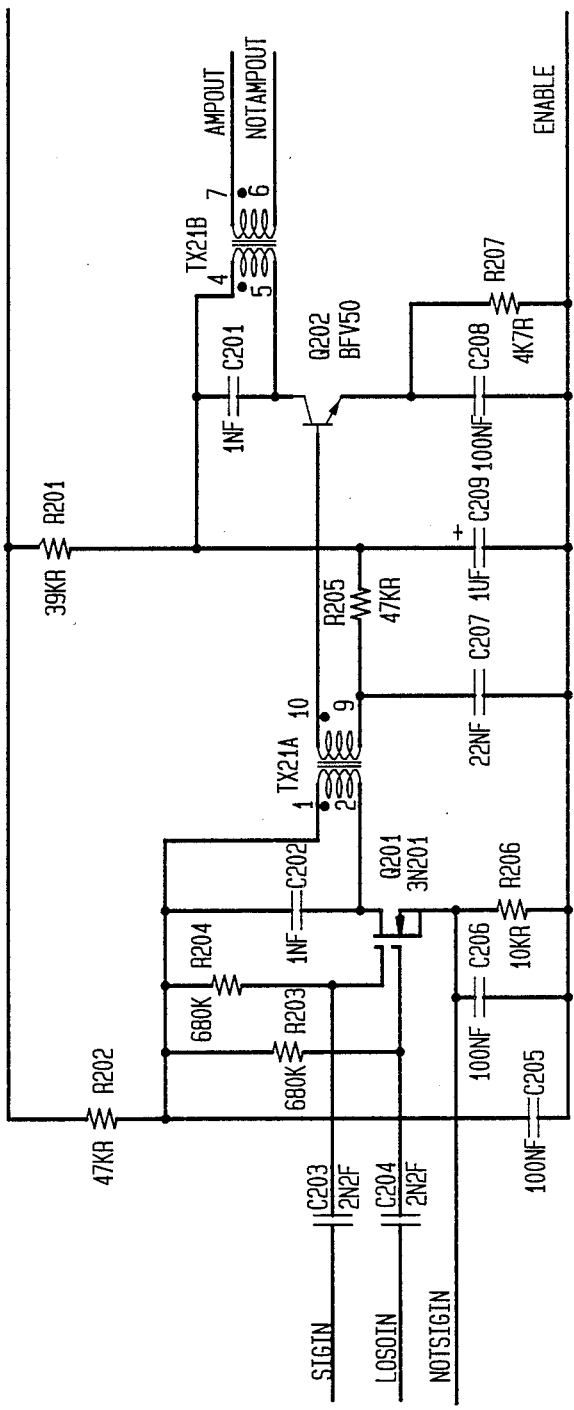
Figure 17:
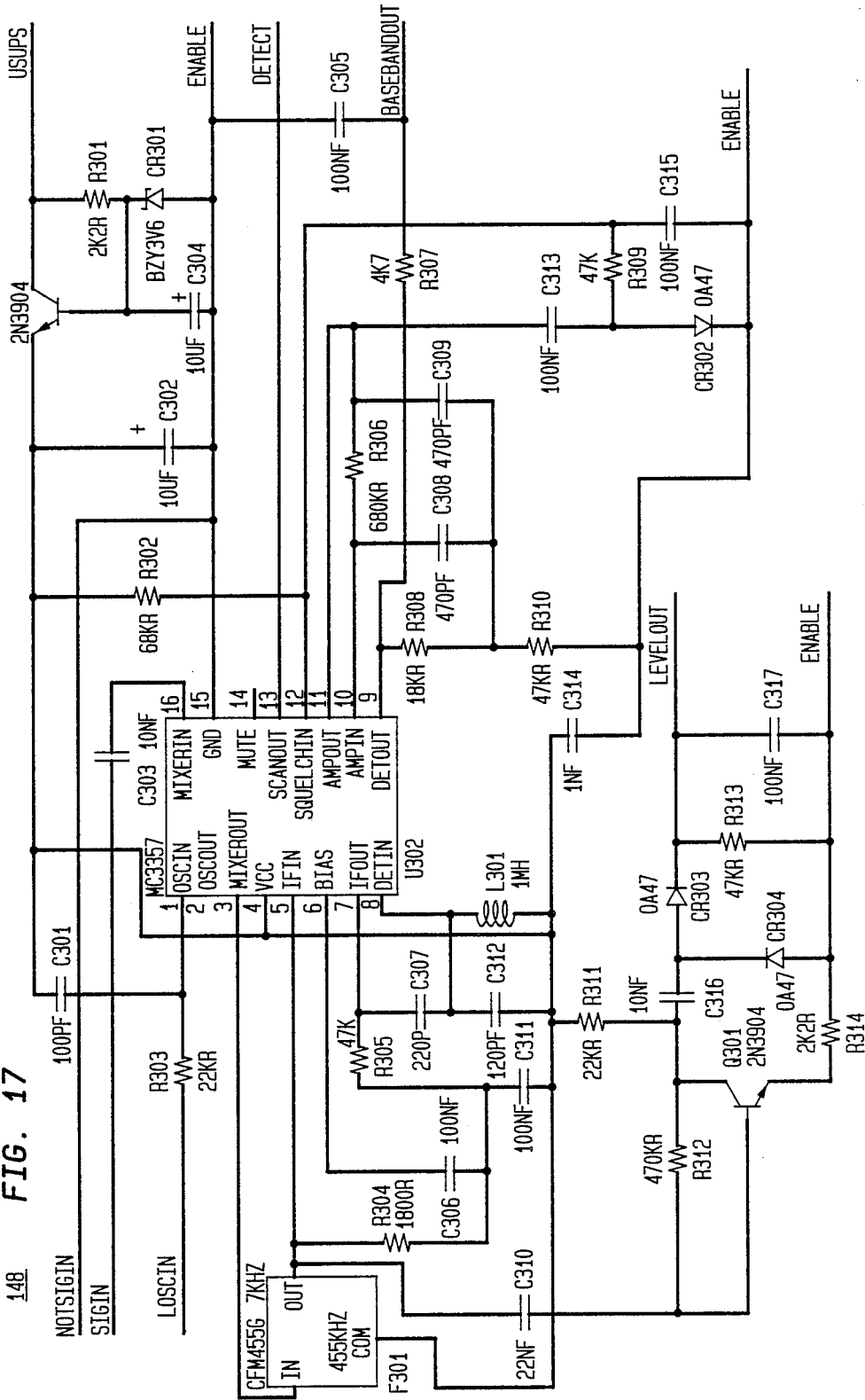
Figure 18:
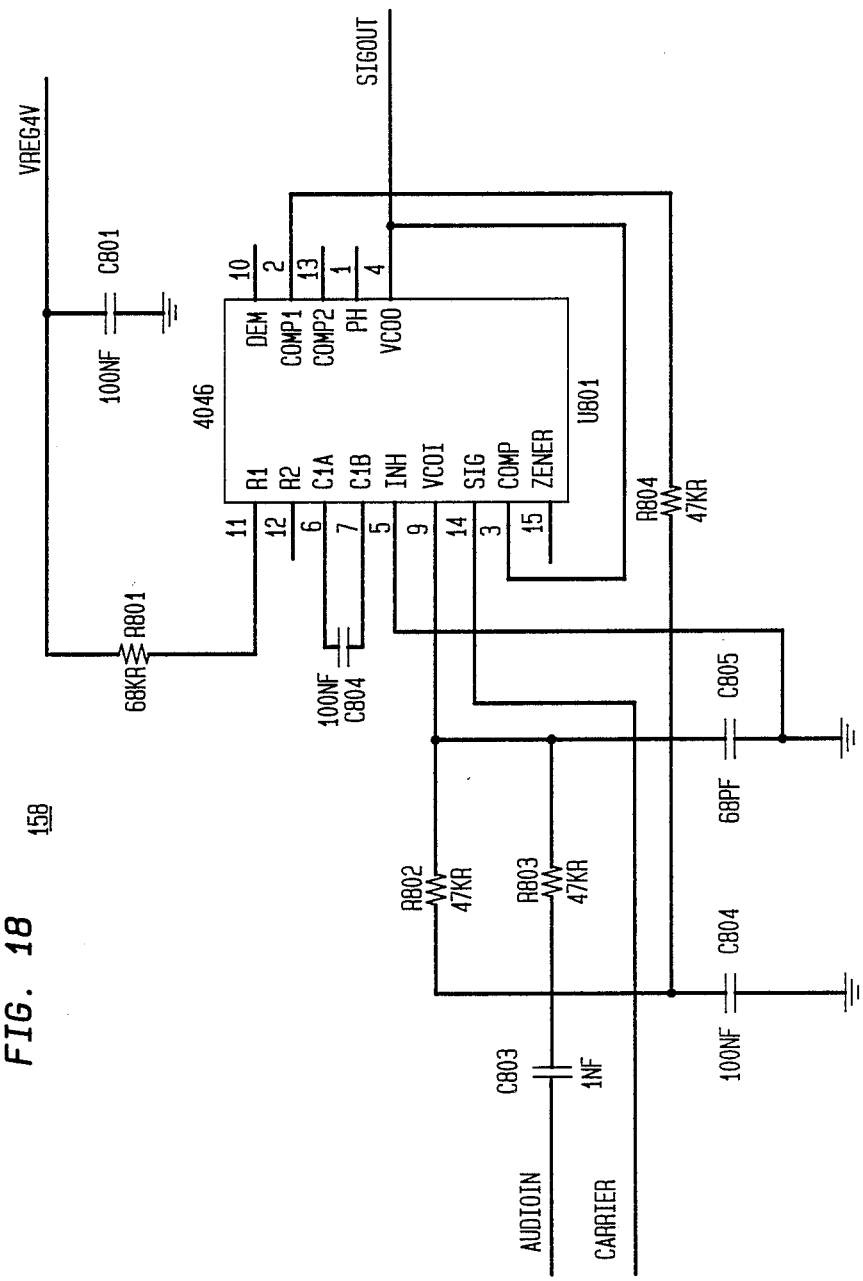

As shown in FIG. 16, the IF amp 146 operates to amplify and up-convert the output of preamp 144 to 140.86 kHz by mixing with a 111.861 kHz local oscillator. The resulting signal is fed to the narrow band FM receiver 148, shown in FIG. 17.

Narrow band FM receiver 148 outputs the demodulated signal which contains both analog voice and very low frequency information (pressure sensor 22) together with digitally encoded data that are separated in the frequency domain. This block also signals the presence of a carrier as well as a DC output that is a function of the carrier level.

Filter block 150 separates the baseband signal derived in the receiver block 148 into its constituent parts. Low pass filtering extracts the voice signal and DC pressure signal. A 75 Hz bandpass filter extracts the signaling subcarrier 114, likewise a 7.5 kHz bandpass filter extracts the data subcarrier 108. These two subcarriers are decoded in the data and signal decoder blocks 154 and 156, respectively.

The signal decoder block 156 recovers the signal clock (37.5 Hz). At each clock transition a 3-bit word is decoded. A more detailed description of the subcarrier modulation scheme was described earlier in connection with FIG. 9.

The last two bits of the decoded word in signal decoder 156 are used to reconstruct a continuously sent 64-bit serial number, unique to each pen. The first bit is further de-multiplexed to monitor one of the four inputs, signals 55, 56, 74 and 76 once every four clock cycles. Synchronization to mark the begining of each 64-bit word and the beginning of the 4-bit sub-multiplex cycle is achieved by a short 180 degree phase reversal in the 28.57 kHz carrier 84. This framing pulse 120 also serves to "zero" the pressure signal in the pressure reference block 152. The sync pulse is used to recover the pressure signal 57 absolute phase and thus the zero pressure reference.

The 7.5 kHz subcarrier 108 is modulated in a similar way to the 75 Hz subcarrier 114. A Baud rate of 2.4 kHz is used. The 3-bit word thus derived indicates the state of the data channel 58.

Referring now to FIGS. 15-19, a more detailed description of each block is now given.

In FIG. 15, the first element of the receive chain is the pre-amplifier 144, which consists of a single transistor Q101 selected for its high gain and low noise characteristics, configured in the common emitter mode. The circuit exhibits its bandpass characteristic due to tuning of the primary of a transformer in the collector circuit of the transistor.

The amplified signal is applied to the IF amplifier 146 (FIG. 16) which consists of a dual gate FET Q201, acting as a mixer and amplifier. A tuned transformer TX21A selects the required mixing product at 140.86 kHz. Transistor Q202 in the common emitter mode gives additional gain. The output is coupled to the next stage by transformer TX21B.

The narrow band FM receiver 148 (FIG. 17) is based on a Motorola MC3357. A centrally generated local oscillator is mixed on this IC together with the 1st IF frequency to produce various mixing products including 455 kHz which is selected by the ceramic filter. The resulting signal is then hard limited and the audio baseband is recovered by an on-chip quadrature detector. Resistor R307 and capacitor C305 act as a de-emphasis network. A bandpass filter consisting of R306, 308, 310, C308, 309 and a detector C313, 315, R309 and diode CR302 form a noise detector which activates a signal detect in the presence of a sufficiently strong input signal. Transistor Q301 amplifies the IF signal which is then detected by diodes CR303, 304 to form a DC signal (LEVEL OUT) that is approximately proportional to the carrier input level.

The 56 kHz modulator block 158 (FIG. 18) is based on the HC4046 PLL IC. The PLL is phase locked to 56 kHz centrally generated. The time constant of the loop is longer than the period of the lowest modulating frequency, therefore audio applied to the modulating port of the VCO causes phase modulation, however the carrier frequency stays locked to the 56 kHz reference.

The 56 kHz driver block 160 (FIG. 19), consists of two HC CMOS buffers that drive the ceramic transducer 161, their inputs being driven in anti-phase by the output of the 56 kHz modulator. The output power can be varied by driving one of the CMOS buffers from an exclusive OR gate, with a pulse width modulated clock using a pulse repetition frequency typically 8 times as high as the 56 kHz carrier.

Figure 20B:
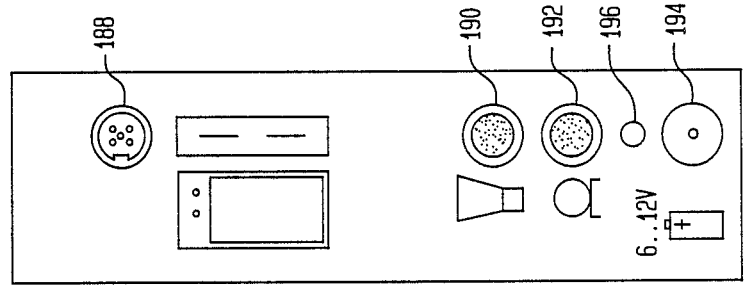
FIGS. 20a-b are top and end views of a preferred keypad dialer construction.
Figure 20A:
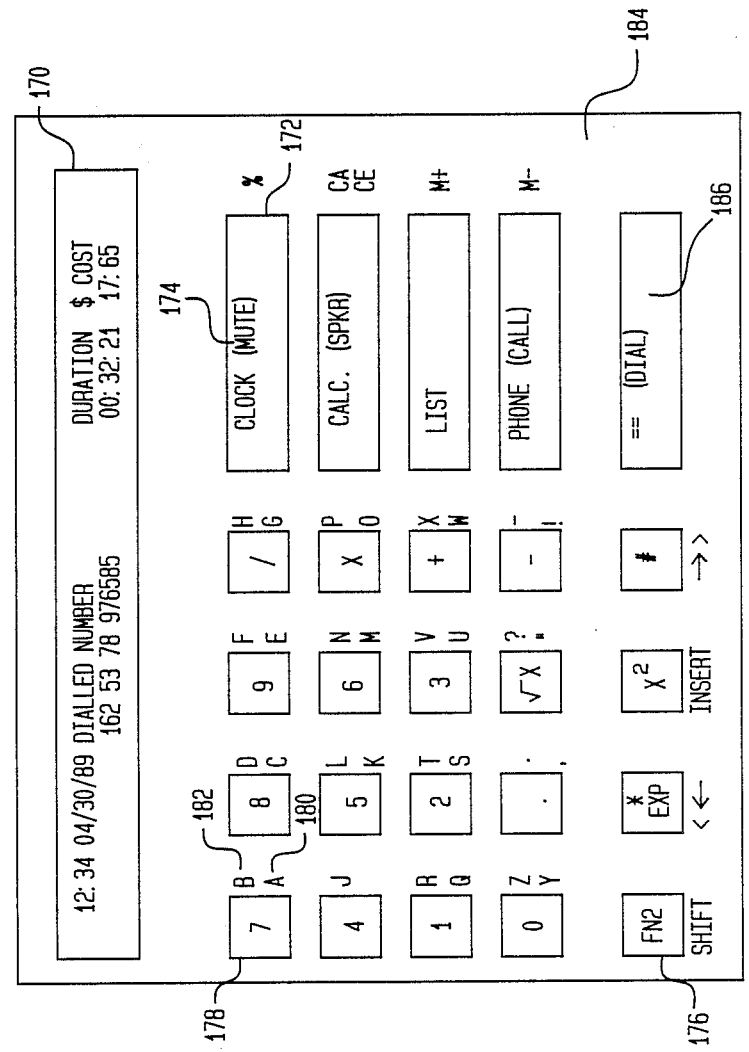

A feature of the invention is the provision of a clock calendar, alarms, phone list and calculator, which may be implemented in keypad dialer 33 as illustrated in FIG. 20a. These features provide audible ringing alarm signals via pen handset 10 earpiece 15, to remind the user of important time-related activities, such as meetings, etc.

In FIGS. 20a-b, there are shown top and end views of a preferred construction of keypad dialer 33, which can be arranged to have memories for long distance carrier route numbers and names/addresses/phone numbers. Thus, not only speed dialing of regular numbers is possible but choice of the least expensive long distance carrier may be made dependant on time of day, day of week, holidays and destination. The call can also be timed and costed as it proceeds. The time and date can be displayed, and alarms may be entered with the keypad. The display and keypad will also function as a simple calculator at any time.

A security code can be optionally required to use the keypad dialer 33, or a different or identical code may be used to permit long distance calls. The base station 34 recognises any dialer pad with the correct account identity (usually automatically sent). Using the access code of base station 34 allows other dialer pads to be on the access list. This is a CT2 security feature (digital cordless standard) that is not available with analog standard cordless systems.

In principle, the dialer design is applicable to any existing cordless phone protocol or standard. However, for maximum utility, the CT2 standard is prefered. Normally, a particular implementation of keypad dialer 33 will only work with one particular cordless phone protocol or standard.

Optionally, encryption methods may be added for full voice security. This can be designed with the required level of security without any quality degradation or increase in bandwidth, since CT2 uses digital packets of speech. This facility is not available with analog cordless base stations.

Display 170 is a dot matrix display of at least 480×16 dots to allow display of instructions, phone numbers, cost, calculations, time, data and other appropriate information in any language including non-alphabetic scripts such as Chinese. The keypad has twenty small keys for data entry and five large keys for function selection. Other keypad layouts with differing sizes and quantities of keys are possible.

The key 172, for example, has a main legend and an alternate function legend 174. The alternate function is obtained when the PHONE function key has been depressed. Pressing the Shift/FN2 key 176 enables the main legend function. The small buttons or keys have differing operations for data entry depending on whether CLOCK, CALC, LIST or PHONE mode of the keypad dialer 33 is current. For example, the key 178 is marked "7" in CLOCK, CALC and PHONE modes but the character legend "A" (180) is valid if in the LIST mode. In LIST mode the upper character legend "B" (182) beside the key is valid if the FN2 key 176 has been depressed beforehand or at the same time.

An overlay may be set on the background 184 of keypad dialer 33 if an alternate language or functionality has been programmed. A number can be dialed as it is entered for minimum post-dial delay, or any number on the display may be dialed by pressing the "—(dial" key 186 after selecting PHONE mode.

The (call), (spkr), (mute) and (dial) function keys may be used on the keypad dialer 33, or their function executed by operation of the pen/handset buttons and writing pressure, as previously described.

FIG. 20b shows the connections available on the end of keypad dialer 33. Connector 188 is for RS422 type duplex data transfer at various standard rates and protocols. This allows data equipment like PCs to use the cordless link, control features from a PC program or save and load phone/address lists from an external database, or print information such as phone lists, call costs reports etc. In this way Telex, Email and FAX services can be added to the basic keypad dialer.

The auxiliary jacks for speech input and output are available on 190 and 192 connectors, typically 3.5 mm type jack sockets. Conversations can be recorded on a pocket memo recorder with a suitable cable. The socket 194 is a standard coaxial power connector to charge the keypad dialer 33 internal battery. Any voltage DC or AC from 6 V to 12 V is suitable. An automotive power supply may be directly connected with a suitable fused cable from a dashboard cigar socket. Indicator 196 is an L.E.D. indicating that the battery is charging.

Figure 21:
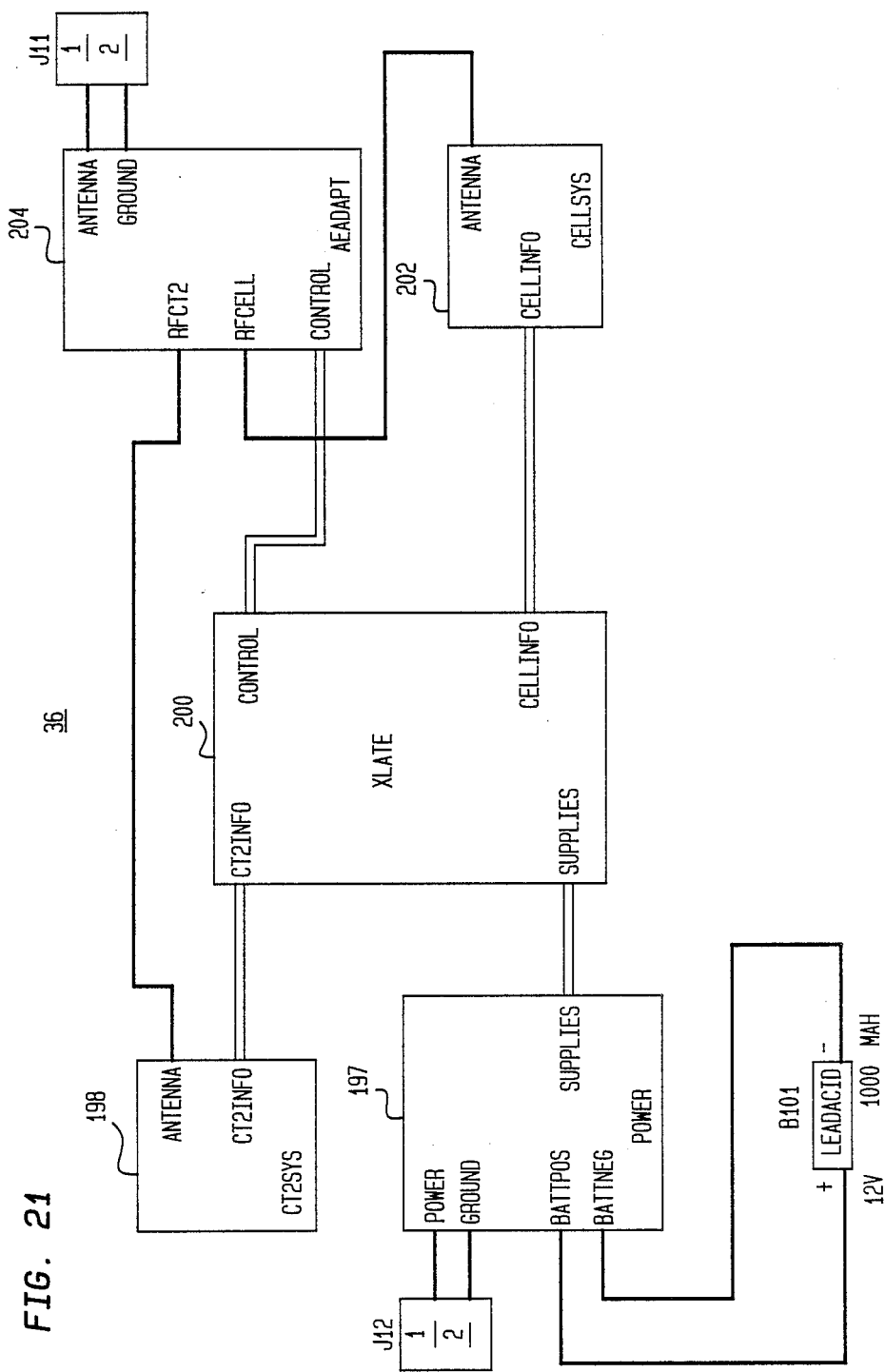
FIG. 21 is an electronic block diagram of an adaptor or transvertor shown in FIG. 4 for automatic interface to cellular networks.

FIG. 21 shows an electronic block diagram of a transvertor shown as 36 in FIG. 4. Transvertor 36 is used for communication with celullar telephone systems and comprises a power supply 197, interface 198 providing an RF link with keypad dialer 33, a conversion block 200 providing protocol conversion from keypad dialer 33 to the cellular system, interface 202 providing an RF link to a cellular telephone system, and an antenna adapter 204 for combining RF links and splitting transmit/receive communications.

Transvertor 36 requires no operator intervention and is fully automatic without any power switch. The unit may clip into a car dashboard and use the vehicle power supply and external antenna. Alternatively, the unit may fit into a briefcase using its internal battery pack and a "rubber duck" type clip-on antenna for up to one hour of speech use. The unattended unit may be up to 100 m from the keypad dialer (limited by standards) in CT2 mode and 5 km (limited by standards) in DPRS mode. The distance from transvertor 36 to base station 34 depends on the cellular protocol. The unit automatically powers on or off and selects CT2 or DPRS mode based on distance.

In summary, pen handset 10 provides a unique solution to convenient telephone communication via easily accessible control buttons on the pen body which provide the full range of cordless telephone options while providing a fully functional writing pen. These functions are also controllable via pen cartridge depression based on use of a novel pressure sensor. The overall design achieves maximum convenience in telephone functions with minimal disturbance to others.

Having described the invention with regard to certain specific embodiments thereof, it is to be understood that the description is not meant as a limitation since further modifications may now suggest themselves to those skilled in the art and it is intended to cover such modifications as fall within the scope of the appended claims.

We claim:

1. A cordless pen telephone handset for a telephone system comprising:
   a functional writing pen; and
   telephone communication means comprising microphone and speaker means disposed within said pen for simultaneous two-way voice communication, said microphone and speaker means simultaneously maintaining an ultrasonic link for cordless communication with an ultrasonic transceiver means located external to said pen, wherein said microphone and speaker means are also used, respectively, as receive and transmit transducers of said ultrasonic link, each of said transducers being mounted in a separate aperture formed in said pen as an acoustic chamber for defining an acoustic transmission line allowing separation of speech and ultrasonic sound waves;

said telephone communication means being operable by fingertip control of depressable buttons mounted on said pen while it is hand-held in normal penmanship and handset positions.

2. The handset of claim 1 wherein said ultrasonic transceiver means comprises alphanumeric keypad telephone dialing means providing dialing signals via a cordless RF link to a base station which is connected to a telephone network.

3. The handset of claim 2 wherein a unique serial number is electronically stored and transmitted to said keypad dialing means for identification.

4. The handset of claim 2 wherein said keypad dialing means further comprises a battery charger for a rechargeable set of batteries and a loudspeaker, control and adaptor interface means for providing voice communications over an RF link.

5. The handset of claim 2 wherein said keypad dialing means cordless RF link is selectable from among cordless phone, cellular phone and personal two-way communications.

6. The handset of claim 2 wherein said keypad dialing means further comprises an alarm clock which signals the user via the speaker means, providing an audible reminder of time-related activities.

7. The handset of claim 2 wherein said keypad dialing means further comprises a loudspeaker usable in conference call applications, said control buttons being arranged to switch between said pen handset speaker means and said keypad loudspeaker by alternate depression to effect a clicking operation, both pen handset and loudspeaker being operable simultaneously with normal pen handset operation.

8. The handset of claim 2 wherein said keypad dialing means has a holder for storage of said writing implement while not in use.

9. The handset of claim 2 wherein said keypad dialing means is of pocket-size construction to allow for mobility.

10. The handset of claim 2 wherein battery life is conserved by periodic powering of receiver circuits only when said keypad dialing means is not in use.

11. The handset of claim 10 further comprising a solar cell for automatically trickle charging a rechargeable battery power source mounted in said writing implement.

12. The handset of claim 1 wherein said writing implement further comprises pressure sensor means for providing telephone system control functions based on the writing pressure applied to said implement.

13. The handset of claim 12 wherein said telephone system control functions include on-hook/off-hook control of call access by depression of said writing implement with a predetermined amount of pressure.

14. The handset of claim 12 wherein telephone system control functions include volume adjustment of said speaker means dependent upon the amount and duration of implement depression.

15. The handset of claim 12 wherein said ultrasonic link to said keypad dialing means carries writing pressure information, speech, signaling and data using frequency division multiplex signaling.

16. The handset of claim 15 wherein said signaling is provided by M-ary relative phase shift keying to convey said depressable button signals, received ultrasonic signal strength and a unique writing implement serial number.

17. The handset of claim 15 wherein battery life is conserved by utilizing said signal strength to adjust said keypad dialing means power output in relation to the distance between it and said writing implement.

18. The handset of claim 15 wherein said data is provided by M-ary relative phase shift keying to convey a 3-bit data channel to said keypad dialing means.

19. The handset of claim 18 wherein said 3-bit data channel is operative with pen-mounted sensors to provide information relating to pen motion.

20. The handset of claim 1 wherein said depressable control buttons comprise an on-hook/off-hook switch control button and a mute control button for screening private conversation during telephone calls.

21. The handset of claim 1 wherein said speaker means comprises a pen-mounted earpiece which is activated by an audible ringing signal upon receipt of an incoming call, which may be answered by depression of said control button.

22. A method of providing cordless telephone communications comprising the steps of:

providing telephone communication means comprising microphone and speaker means disposed within a functional writing pen having a set of depressable buttons mounted thereon, said microphone and speaker means simultaneously maintaining an ultrasonic link for simultaneous two-way cordless communication with an ultrasonic transceiver means located external to said pen, wherein said microphone and speaker means are also used, respectively, as receive and transmit transducers of said ultrasonic link, each of said transducers being mounted in a separate aperture formed in said pen as an acoustic chamber for defining an acoustic transmission line allowing separation of speech and ultrasonic sound waves; and operating said telephone communication means by fingertip depression of said buttons while it is hand-held in normal penmanship and handset positions.

23. The method of claim 22 wherein said writing implement has mounted therein a pressure sensor for sensing writing pressure, said operating step comprising depression of said writing implement for providing telephone communication functions.

24. A cordless telephone system comprising:

telephone handset means incorporated within a functional writing pen, said telephone handset means comprising microphone and speaker means for simultaneous two-way voice communication, said microphone and speaker means simultaneously maintaining an ultrasonic link for cordless communication with an ultrasonic transceiver means located external to said pen, wherein said microphone and speaker means are also used, respectively, as receive and transmit transducers of said ultrasonic link, each of said transducers being mounted in a separate aperture formed in said pen as an acoustic chamber for defining an acoustic transmission line allowing separation of speech and ultrasonic sound waves;

pressure sensor means provided in said pen for control of telephone system functions based on the writing pressure applied to said pen, said telephone system control functions including on-hook/off-hook control of call access by depression of said pen with a predetermined amount of pressure, depressable buttons mounted on said pen enabling fingertip control of said microphone and speaker means while said pen is hand-held in normal penmanship and handset positions;

keypad dialing means in communication with said pen telephone handset means via said ultrasonic link; and a base station maintained in communication with said keypad dialing means by an RF link.

25. The cordless telephone system of claim 24 wherein said pen telephone handset means comprises microphone and speaker means being operable by fingertip control of depressable buttons mounted thereon while it is hand-held in normal penmanship and handset positions.

* * * * *